US009367863B2

(12) United States Patent
Cassell et al.

(10) Patent No.: US 9,367,863 B2
(45) Date of Patent: Jun. 14, 2016

(54) TEMPORARY INTERNET SPEED INCREASE

(75) Inventors: Stuart Cassell, Marietta, GA (US); Leah P'Simer, Dunwoody, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 12/851,769

(22) Filed: Aug. 6, 2010

(65) Prior Publication Data
US 2010/0299236 A1  Nov. 25, 2010

Related U.S. Application Data

(63) Continuation of application No. 12/466,863, filed on May 15, 2009.

(60) Provisional application No. 61/144,967, filed on Jan. 15, 2009.

(51) Int. Cl.
| | |
|---|---|
| *G06Q 30/04* | (2012.01) |
| *H04L 29/08* | (2006.01) |
| *H04L 12/24* | (2006.01) |
| *G06F 9/50* | (2006.01) |
| *G06F 3/06* | (2006.01) |

(52) U.S. Cl.
CPC ............ *G06Q 30/04* (2013.01); *H04L 41/5006* (2013.01); *H04L 67/1097* (2013.01); *G06F 3/067* (2013.01); *G06F 9/5072* (2013.01)

(58) Field of Classification Search
CPC ............ H04L 41/5003; H04L 41/5006; H04L 41/5009; G06Q 30/02; G06Q 30/0251; H04M 15/81; H04M 2215/0112; H04M 2215/22

USPC ......................................................... 709/226
See application file for complete search history.

(56) References Cited

U.S. PATENT DOCUMENTS

| | | | |
|---|---|---|---|
| 5,812,545 A | 9/1998 | Liebowitz et al. | |
| 5,901,228 A | 5/1999 | Crawford | |
| 6,230,203 B1 | 5/2001 | Koperda et al. | |
| 6,738,348 B1 * | 5/2004 | Rollins | 370/230 |
| 7,072,968 B2 * | 7/2006 | Mikami et al. | 709/229 |
| 7,768,920 B2 | 8/2010 | Goshen et al. | |
| 7,912,001 B2 * | 3/2011 | Wright | 370/329 |
| 2001/0044845 A1 * | 11/2001 | Cloonan et al. | 709/226 |

(Continued)

OTHER PUBLICATIONS

Jeff Baumgartner, "Buckeye launches bandwidth-on-demand", Jan. 18, 2006, CED mazagine, http://www.cedmagazine.com/news/2006/01/buckeye-launches-bandwidth-on-demand.*

(Continued)

*Primary Examiner* — Joe Chacko
(74) *Attorney, Agent, or Firm* — Merchant & Gould P.C.

(57) ABSTRACT

A temporary Internet bandwidth increase is provided. A speed preview interface is presented for obtaining a request for an Internet bandwidth increase from a customer. The eligibility of the customer for the requested increase of the Internet bandwidth is verified. The increase of Internet bandwidth for the customer is provisioned for a predetermined period of time based on the verification of eligibility of the customer. The predetermined period of time may be a temporary fixed period of time or a period of time based on billing status. When the predetermined period of time is a temporary fixed period of time, the increase in Internet bandwidth is terminated after lapse of the temporary fixed period of time.

18 Claims, 23 Drawing Sheets

(56) References Cited

U.S. PATENT DOCUMENTS

| | | | |
|---|---|---|---|
| 2002/0065907 A1* | 5/2002 | Cloonan et al. | 709/223 |
| 2002/0099669 A1* | 7/2002 | Lauer | 705/80 |
| 2002/0188732 A1* | 12/2002 | Buckman et al. | 709/228 |
| 2003/0056063 A1 | 3/2003 | Hochmuth et al. | |
| 2004/0199635 A1* | 10/2004 | Ta et al. | 709/226 |
| 2005/0020243 A1* | 1/2005 | Benco et al. | 455/406 |
| 2005/0021621 A1 | 1/2005 | Welch et al. | |
| 2005/0021739 A1 | 1/2005 | Carter et al. | |
| 2005/0071182 A1* | 3/2005 | Aikens et al. | 705/1 |
| 2005/0083845 A1 | 4/2005 | Compton et al. | |
| 2005/0198682 A1* | 9/2005 | Wright | 725/96 |
| 2006/0120385 A1* | 6/2006 | Atchison et al. | 370/400 |
| 2007/0002897 A1 | 1/2007 | Goshen et al. | |
| 2007/0208826 A1* | 9/2007 | Devolites | 709/219 |
| 2008/0253545 A1 | 10/2008 | Gleichauf | |
| 2009/0083433 A1 | 3/2009 | Liu | |
| 2011/0317717 A1 | 12/2011 | Scarborough | |

OTHER PUBLICATIONS

Office Action mailed Dec. 14, 2010, in co-pending U.S. Appl. No. 12/466,863.
Office Action mailed Jul. 8, 2011, in co-pending U.S. Appl. No. 12/466,863.
Office Action mailed Jan. 10, 2013 in co-pending U.S. Appl. No. 12/466,863.
"Comcast Unleashes its Innovative Powerboost™ Technology on Upstream Speed", http://comcastcalifornia.mediaroom.com/index.php?s=43&item=170, Aug. 22, 2007, 2 pages.
Office Action mailed Jul. 16, 2012, in co-pending U.S. Appl. No. 12/466,863.
Office Action mailed Jul. 29, 2013, in co-pending U.S. Appl. No. 12/466,863.
Office Action mailed Jan. 30, 2014, in co-pending U.S. Appl. No. 12/466,863.
Office Action mailed Sep. 19, 2104, U.S. Appl. No. 12/466,863, 19 pgs.

* cited by examiner

INTERNET TOOLS: SPEED PREVIEW

SPEED PREVIEW

CONGRATULATIONS!

YOUR ORDER IS COMPLETE! PLEASE PRINT THIS PAGE FOR YOUR RECORDS.

ORDER NUMBER: 2000191      DATE: 08/24/2006

| ORDERED BY | | BILLING INFORMATION | |
|---|---|---|---|
| NAME: | JOHN PUBLIC | NAME: | JOHN PUBLIC |
| ADDRESS: | 5130 E 37TH ST N | ADDRESS: | 5130 E 37TH ST N |
|  | WICHITA, KS 67220-2029 |  | WICHITA, KS 67220-2029 |
| EMAIL: | JOHNPUBLIC@YAHOO.COM | | |
| PHONE: | 642-436-5454 (HM) | | |

PRINT PAGE

| SERVICE DESCRIPTION | INTERNET SPEED | MONTHLY |
|---|---|---|
| PREFERRED HIGH SPEED INTERNET (UP TO 4Mbps DOWNLOAD / UP TO 512Kbps UPLOAD) SAVE MORE AS A CURRENT CABLE SUBSCRIBER!) | 15Mbps | $49.95 |

COST: $49.95
DISCOUNT: -$0
MONTHLY TOTAL COST: $49.95

TERMS AND CONDITIONS

---

CHANNELS
- HOME
- NEWS
- WEATHER
- MONEY
- SPORTS
- ENTERTAINMENT
- MOVIES
- TELEVISION
- FEATURES
- SEARCH

MY ACCOUNT
- WEBMAIL
- INTERNET TOOLS
- EMAIL
- PASSWORD
- PERSONAL WEBSPACE
- SPAM BLOCKER
- SECURITY SOFTWARE
- PREMIUM ACCESS PASS
- REMOTE DIAL ACCESS
- SPEED PREVIEW
- COMPUTER ACCESS
- PHONE TOOLS
- VIEW/PAY BILL
- CUSTOMER SUPPORT
- ORDER SERVICES

LOGOUT

ACCOUNT SUMMARY: CDTEST ACCOUNT

SERVICES:
HIGH SPEED INTERNET

INCLUDES:
WEBMAIL
7 E-MAIL ADDRESSES
10MB PERSONAL WEBSPACE 1800, 1810, 1820

Fig. 18

| ORDER NUMBER: 2000191 | | DATE: 08/24/2006 |
|---|---|---|
| ORDERED BY | BILLING INFORMATION | |
| NAME: JOHN PUBLIC<br>ADDRESS: 5130 E 37TH ST N<br>WICHITA, KS 67220-2029<br>EMAIL: JOHNPUBLIC@YAHOO.COM<br>PHONE: 642-436-5454 (HM) | NAME: JOHN PUBLIC<br>ADDRESS: 5130 E 37TH ST N<br>WICHITA, KS 67220-2029 | |

PRINT PAGE

| SERVICE DESCRIPTION | INTERNET SPEED | MONTHLY |
|---|---|---|
| PREFERRED HIGH SPEED INTERNET<br>(UP TO 4Mbps DOWNLOAD / UP TO 512Kbps UPLOAD)<br>SAVE MORE AS A CURRENT CABLE SUBSCRIBER!) | 15Mbps | $49.95 |

COST: $49.95
DISCOUNT: -$0
MONTHLY TOTAL COST: $49.95

TERMS AND CONDITIONS

I HAVE READ AND ACCEPTED THE TERMS AND CONDITIONS OF SERVICE.
I HAVE READ AND ACCEPT THE TERMS OF THE HIGH SPEED INTERNET SUBSCRIBER
AGREEMENT AND ACCEPTABLE USE POLICY.

PRINT PAGE

Fig. 19

TEMPORARY INTERNET SPEED INCREASE

RELATED APPLICATIONS

This application is a continuation of application Ser. No. 12/466,863, now issued as U.S. Pat. No. 9,189,807, filed May 15, 2009, which claims the benefit of U.S. Provisional Application No. 61/144,967, filed Jan. 15, 2009, which both are incorporated herein by reference.

FIELD OF THE INVENTION

This disclosure relates in general to providing telecommunications customers temporary access to enhanced services, and more particularly to providing telecommunications customers temporary Internet speed increases as an enticement for upgrading to a higher tier of service.

BACKGROUND

On the Internet, many paths may exist between a given pair of nodes. The total message-carrying capacity (bandwidth) between two given nodes is the maximum amount of data per unit time that can be transmitted from one node to the other. Using a technique called packet switching, this data can be transmitted along several paths at the same time.

Service providers may provide their subscribers with various services including multimedia services by which subscribers obtain television and other multimedia content for viewing, data services such as Internet access, and telephony services including local, long distance, and/or video conferencing telephone services. In a bundled scenario, a provider may deliver two or more of these services to subscribers over an access network physical layer that is common to the bundled services.

However, applications and services continue to be developed to drive consumers demand for increases in Internet bandwidth. For example, the escalating popularity of social networking sites and the emergence of high-bandwidth applications, such as voice and video, act to increase consumer demand. Video downloads and transmissions are the most bandwidth intensive, wherein a video download may consume 8 to 10 times the bandwidth required for voice or music.

Further, products are increasingly becoming available to allow consumers to link their broadband audio, video, and data downloads to electronic devices and gadgets throughout their home. In a networked home, cable modems, digital video recorders (DVR), voice over IP (VoIP) systems, personal computers, and TVs are all linked. As each of the latest digital entertainment services come on line, the need for bandwidth further increases.

To fully take advantage of the new capabilities, consumers must upgrade to higher tiered services and packages. However, most customers have difficulty in concretely identifying rates of data throughput. Thus, to increase revenue by enticing users to switch to higher tiers of service, a way to provide temporary Internet speed increases to customers is needed.

SUMMARY OF THE INVENTION

To overcome the limitations described above, and to overcome other limitations that will become apparent upon reading and understanding the present specification, embodiments for providing telecommunications customers temporary Internet speed increases as an enticement for upgrading to a higher tier of services is disclosed.

The above-described problems are solved by presenting a user a Speed Preview interface that allows customers with a first tier of service to request a faster tier for a limited time. PacketCable Multimedia (PCMM) is used to change the speed on a customer's modem on the fly.

An embodiment includes a method that provides a temporary Internet bandwidth increase. The method includes presenting a speed preview interface for obtaining a request for an Internet bandwidth increase from a customer, verifying eligibility of the customer for the requested increase of the Internet bandwidth and provisioning the increase of Internet bandwidth for the customer for a predetermined period of time based on the verification of eligibility of the customer.

In another embodiment, a system for providing a temporary Internet bandwidth increase is disclosed. The system includes a portal for presenting a speed preview interface for obtaining a request for an Internet bandwidth increase from customer, a middleware platform, coupled to the portal, for receiving the request for the Internet bandwidth increase from the customer and verifying eligibility of the customer for the requested increase of the Internet bandwidth and a cable modem termination system, coupled to a PCMM policy server and application manager servers, for provisioning the increase of Internet bandwidth for the customer for a predetermined period of time based on the verification of eligibility of the customer.

A computer readable medium including executable instructions which, when executed by a processor, provides a temporary Internet bandwidth increase is disclosed. The computer readable medium includes instructions executable by the processor to present a speed preview interface for obtaining a request for an Internet bandwidth increase from a customer, verify eligibility of the customer for the requested increase of the Internet bandwidth and provision the increase of Internet bandwidth for the customer for a predetermined period of time based on the verification of eligibility of the customer.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout:

FIG. 18 shows the Thank You page that is displayed if the upgrade request is accepted by the provisioning system according to one embodiment;

FIG. 19 shows the Printer Friendly Upgrade Thank You page according to one embodiment;

DETAILED DESCRIPTION

Figure 1:
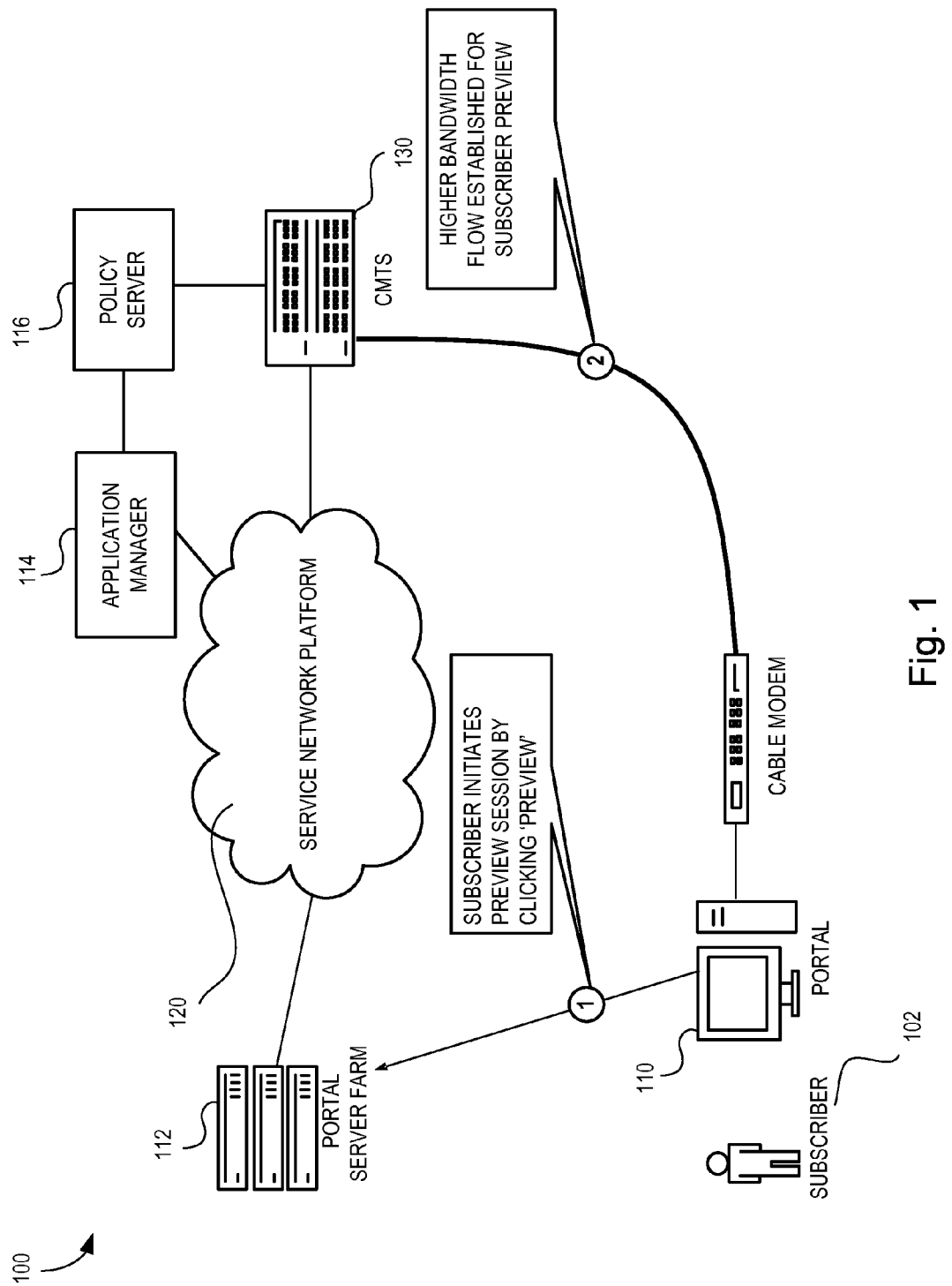
FIG. 1 illustrates the customer-initiated speed preview process according to one embodiment.

Embodiments of the present invention are directed to providing telecommunications customers temporary Internet speed increases as an enticement for upgrading to a higher tier of service. Speed Preview will allow customers with a first tier service to temporarily experience higher tier package speeds. Speed Preview uses PacketCable Multimedia (PCMM) to temporarily change the speed on a customer's modem without requiring a reboot of the cable modem. Customers who meet certain eligibility requirements will be able to start a speed preview by logging into the service provider system and navigating to Internet Tools landing page. Customers will also have the chance to permanently upgrade to a higher tier right from the speed preview section of Internet Tools in the service provider system.

When the customer clicks on a "Speed Preview" link, the back-end systems perform the checks necessary to determine if the customer is eligible for a speed preview trial. If the customer is not eligible, an error message is presented. If the customer is eligible, the service provider platform signals the PCMM application manager to request that a predetermined policy be applied. The PCMM application manager negotiates with the cable modem termination system (CMTS) to determine if sufficient bandwidth is available to support the request. If not, the service provider must be notified so an error message can be displayed to the customer. If bandwidth is available the request is granted, a service flow is established between the cable modem and CMTS, and the service provider is notified so that the customer is aware that their request has been fulfilled.

Several systems are used to provision the temporary speed increases according to an embodiment of the invention. Service Broker, the middleware platform used for provisioning all High Speed Internet services, makes calls to various back-end systems using at least one predetermined procedure. Service Broker is used to query the SAMP Database for speed preview eligibility information, some customer account information and speed preview provisioning status information. Service Broker uses the Provisioning Automation Web Services (PAWS), a web services platform, to provision and de-provision speed preview offers. Information is collected from many back-end systems and business rules act on these data to determine eligibility for Speed Preview offers. Web services provide a way to access billing and account info. Web services are used to obtain account information such as the customer's address, obtain billing data such as whether or not the account is in good standing, obtain information about tier speeds and prices in different markets, create an upgrade order in the billing system, and provision the new service level. Device monitoring software manages the equipment at the "edge" of the high speed Internet network, including customer modems. The device monitoring software acts as the customer care front-end to the data warehousing application system. The data warehousing applications enable more informed business decisions and better customer care, with high performance and cost efficiencies. The device monitors connect to the backend servers of a data warehousing application and validate that cable modems meet or exceed the required DOCSIS standards for supporting the PCMM protocol and that the customer's cable modem is online.

FIG. 1 illustrates the customer-initiated speed preview process 100 according to one embodiment. The customer 102 via a portal 110, such as a personal computer, signs-on to the service provider network and clicks on a "Speed Preview" link. The portal server farm 112 is the back-end system that performs the checks necessary to determine if the customer is eligible for a speed preview trial. If the customer is eligible, the portal server farm 112 signals through the service provider platform 120 to request that a predetermined policy be applied. A PCMM application server 114, which provides application management, relays the request from the portal server farm 112 to a PCMM policy server 116. The PCMM policy server 116 determines if sufficient bandwidth is available to support the request. If sufficient bandwidth is available to support the request, the PCMM policy server 116 provisions the policies to a CMTS device 130. A new service flow is established increasing the speed of the cable modem.

Figure 2:
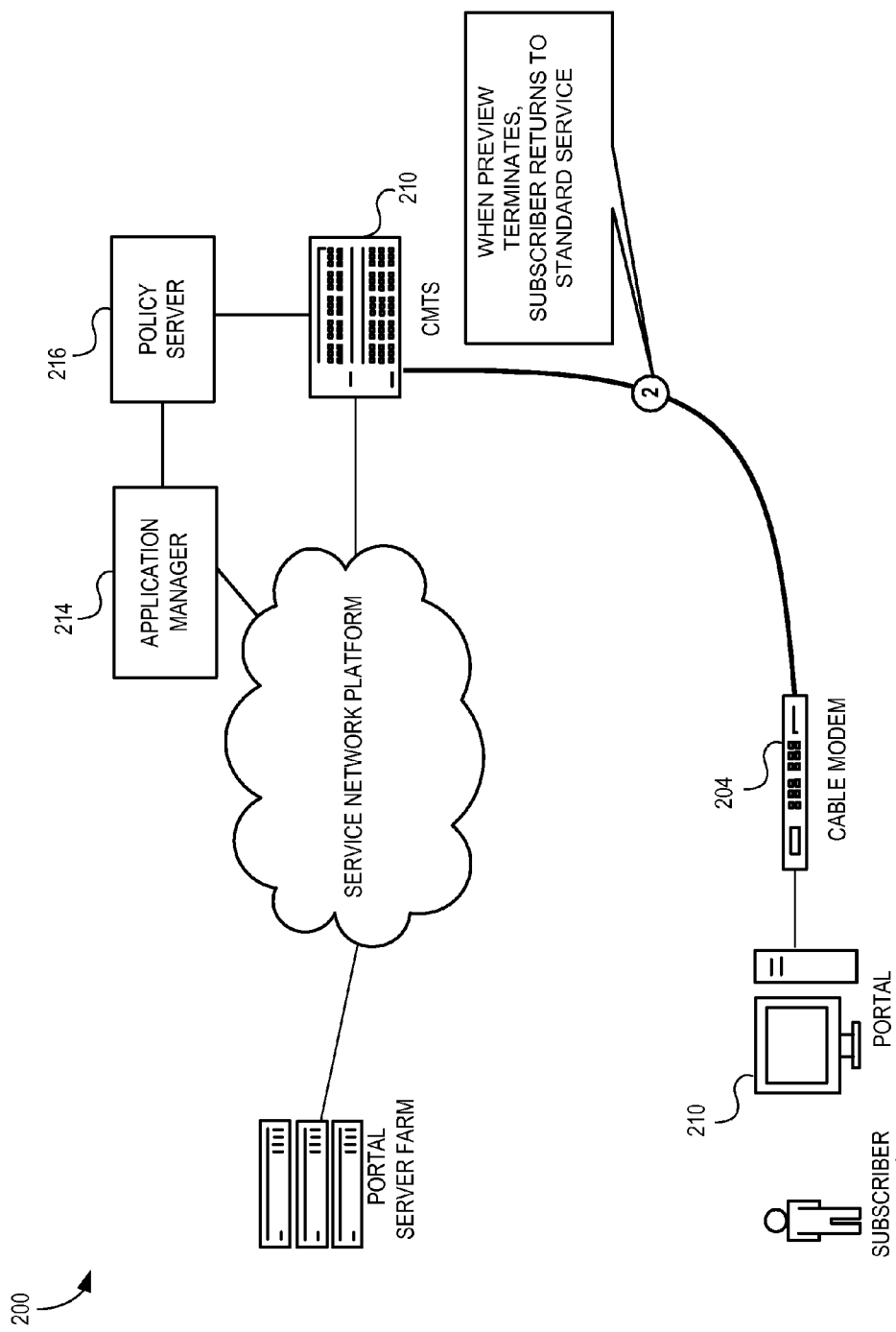
FIG. 2 illustrates the termination of speed preview process and returning to the subscriber's provisioned rate cap according to one embodiment.

FIG. 2 illustrates the termination of speed preview process 200 according to one embodiment. The customer 202 is utilizing the increased Internet bandwidth provided by cable modem 204 to portal 210. However, when the trial period ends, the PCMM application server 214 instructs the PCMM policy server 216 to terminate the new service flow for providing the increased speed. The PCMM policy server 216 instructs the CMTS device 210 to terminate the new service flow. The CMTS device 210 signals the Cable Modem that the new service flow will be terminated. The subscriber 202 returns to the standard service flow provided by the CMTS 220.

Figure 3:
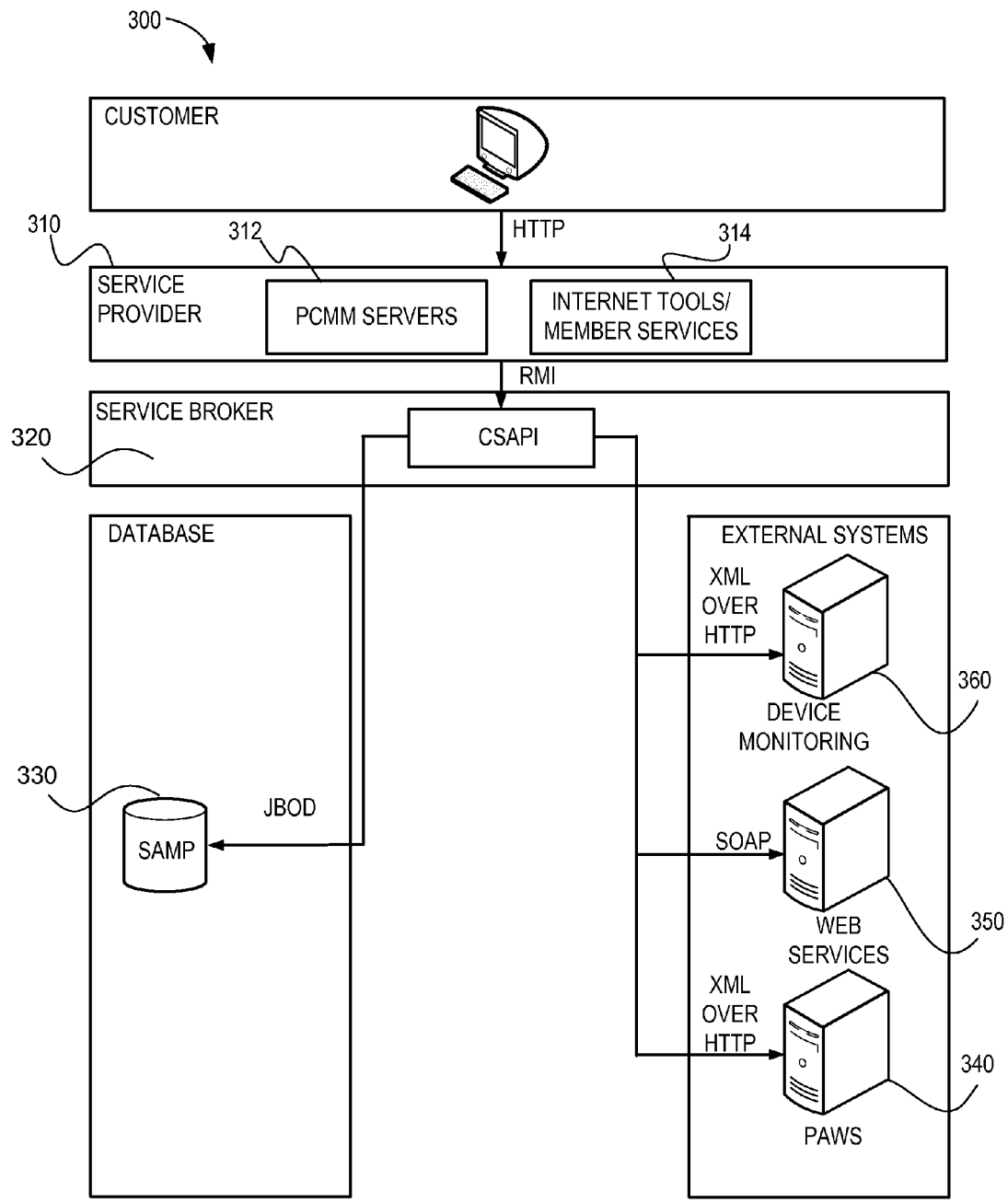
FIG. 3 shows an architecture diagram of the different external systems that are used to provision the temporary speed increases according to one embodiment.

FIG. 3 shows an architecture diagram of the different external systems 300 that are used to provision the temporary speed increases according to one embodiment. Service Broker 320 is the middleware platform used for provisioning all High Speed Internet services provided through the service provider 310. The service provider 310 includes the PCMM servers 312 as well as provisioning the Internet tools 314. Service Broker 320 makes calls to various systems to provision service. Direct calls to Service Broker from the service provider 310 are made using stored procedures. Service Broker is used to query a SAMP database 330 for speed preview eligibility information, some customer account information and speed preview provisioning status information. Service Broker uses the Provisioning Automation Web Services (PAWS) 340, a web services platform to provision and de-provision speed preview. Information is collected from many back-end systems and business rules act on those data to determine eligibility for speed preview offers. Web services 350 are used to obtain account information such as the customer's address, obtain billing data such as whether or not the account is in good standing, obtain information about tier speeds and prices in different markets, create an upgrade order in the billing system, and provision the new service level. Device monitoring software 360 monitors and manages the equipment at the "edge" of the high speed Internet network, including customer modems. The device monitors connect to the backend servers of a data warehousing application and validate that cable modems meet or exceed the required DOCSIS standards for supporting the PCMM protocol and that the customer's cable modem is online.

Figure 4:
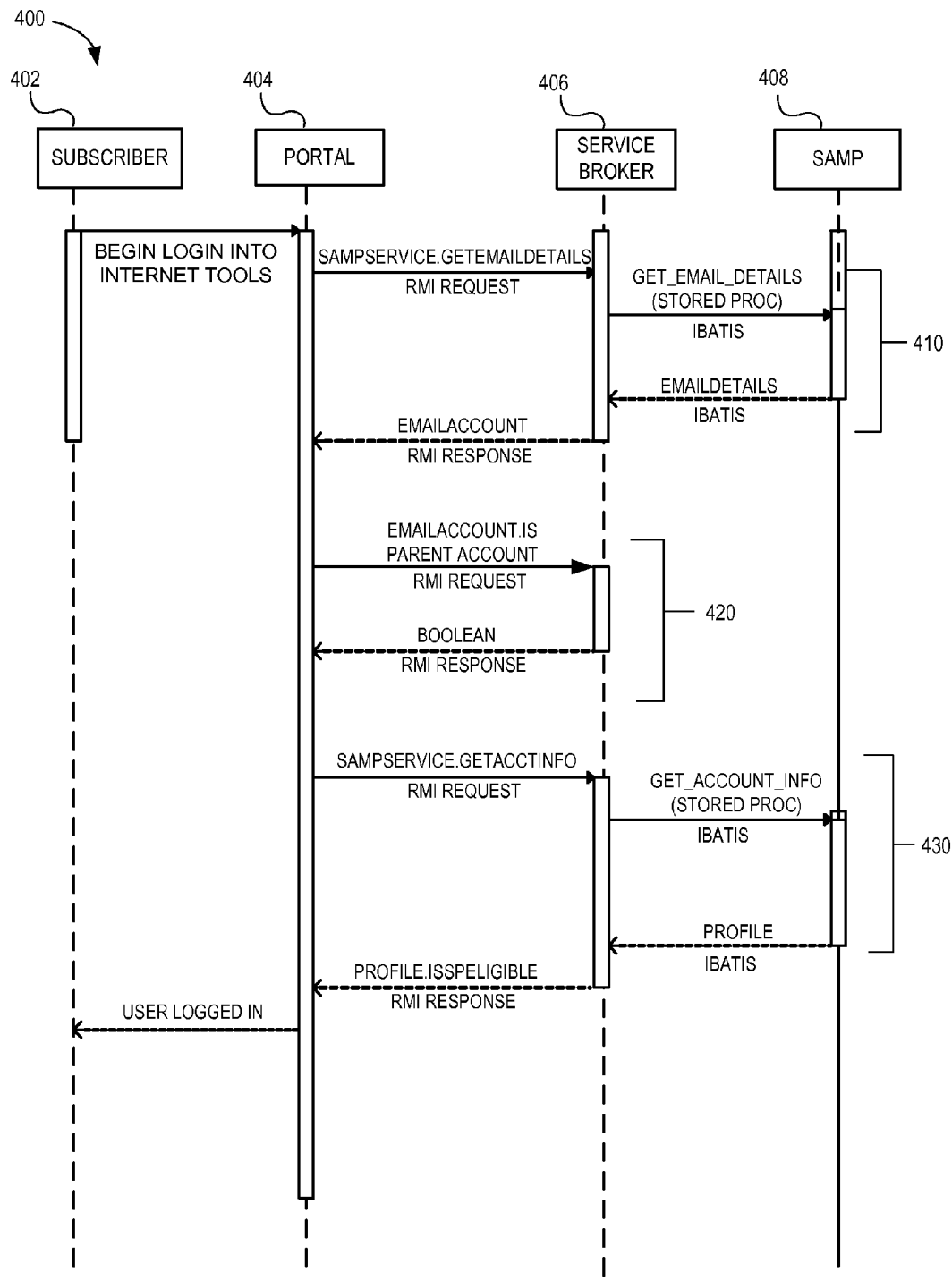
FIG. 4 illustrates the initial eligibility check according to one embodiment.

FIG. 4 illustrates the initial eligibility check 400 according to one embodiment. Before showing the Speed Preview sub-channel, the service provider must verify that the logged in customer is eligible for Speed Preview. The Speed Preview sub-channel is shown only if the subscriber 402 passes four initial eligibility checks. Check 1 is the user must be logged in using the "account holder" userID for the account. Checks 2 and 3 verify the site that the user is associated with is a Speed Preview enabled site and the user's current speed tier is eligible for Speed Preview in their market. Check 4 is the user has only one cable modem on their account. Check 1 is performed using the SAMP stored procedure Get_Email_Details 410. This email account info is used to determine whether or not the user is logged into an account holder or authorized user 420. Only account holder identities will see the Speed Preview options in Internet Tools. The portal 404 communicates with the Service Broker 406 to retrieve profile information from SAMP 408 using the Get_Account_Info stored procedure 430 for checks 2-4.

Figure 5:
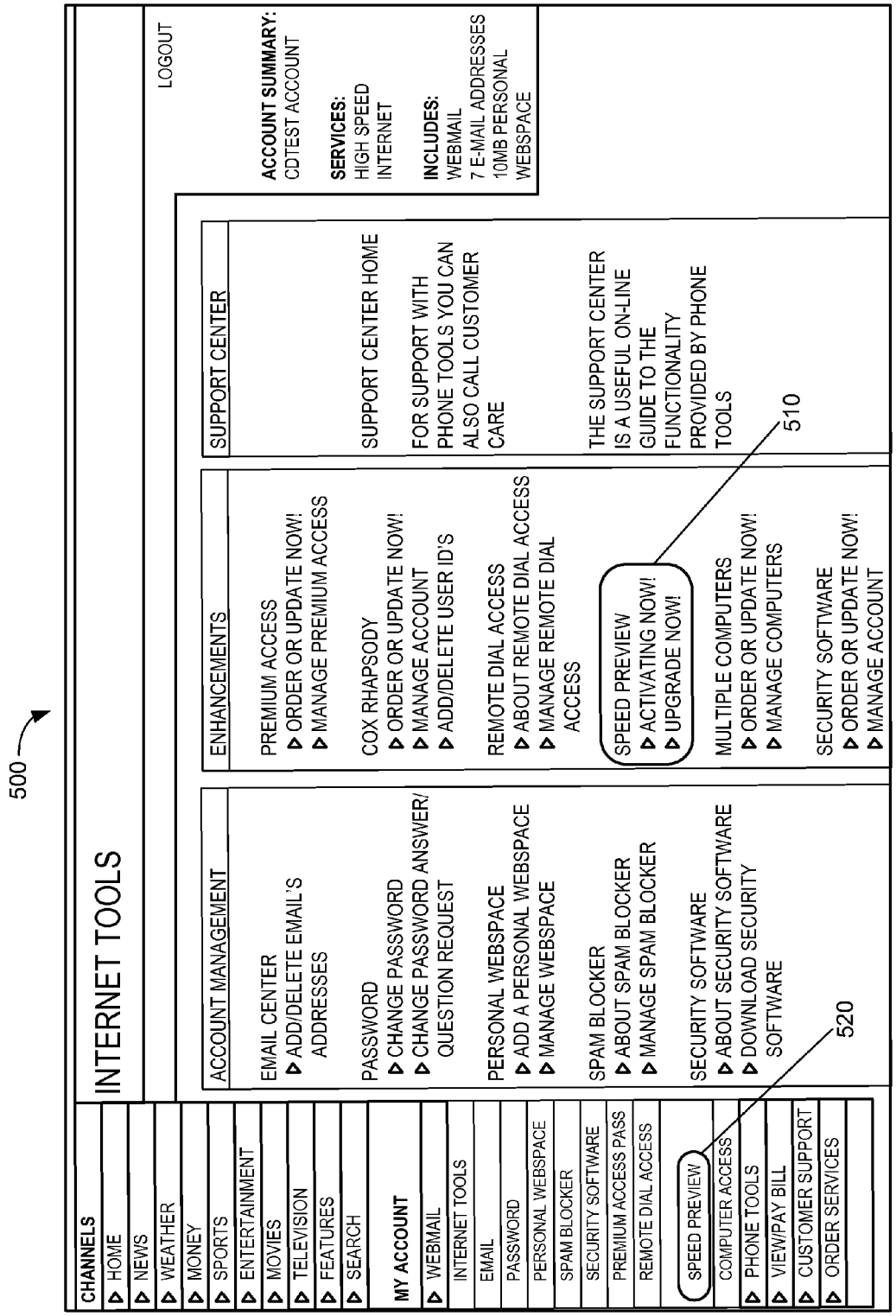
FIG. 5 shows the Internet Tools landing page screen that is displayed with the Speed Preview option according to one embodiment.

FIG. 5 shows the Internet Tools landing page screen 500 that is displayed with the Speed Preview option according to one embodiment. Entitlements will be used to show or hide the speed preview links 510 and menu items 520 based on whether or not the logged in user passes the initial eligibility checks. Speed Preview options 510 are listed on the main Internet Tools landing page.

Figure 6:
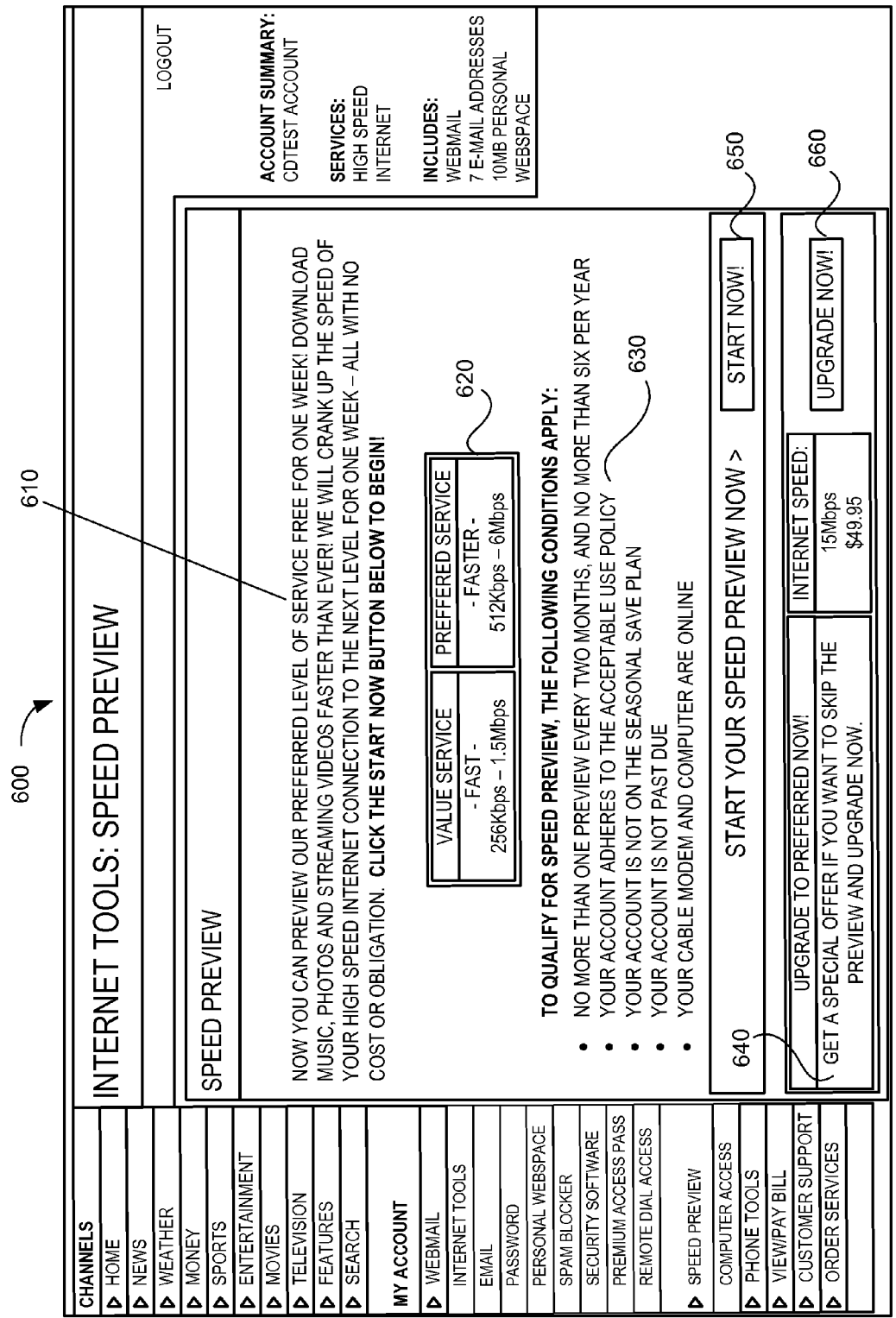
FIG. 6 shows the Speed Preview landing page screen according to one embodiment.

FIG. 6 shows the Speed Preview landing page screen 600 according to one embodiment. This page displays a description of the Speed Preview service 610, a matrix of market-specific tiers and speeds 620, a list of eligibility checks to be performed 630, an offer to upgrade to a higher speed now 640. The user may select the Start Now button 650 for Speed Preview. If the user wants to permanently upgrade to the preferred service, the Upgrade Now button 660 may be selected.

Figure 7:
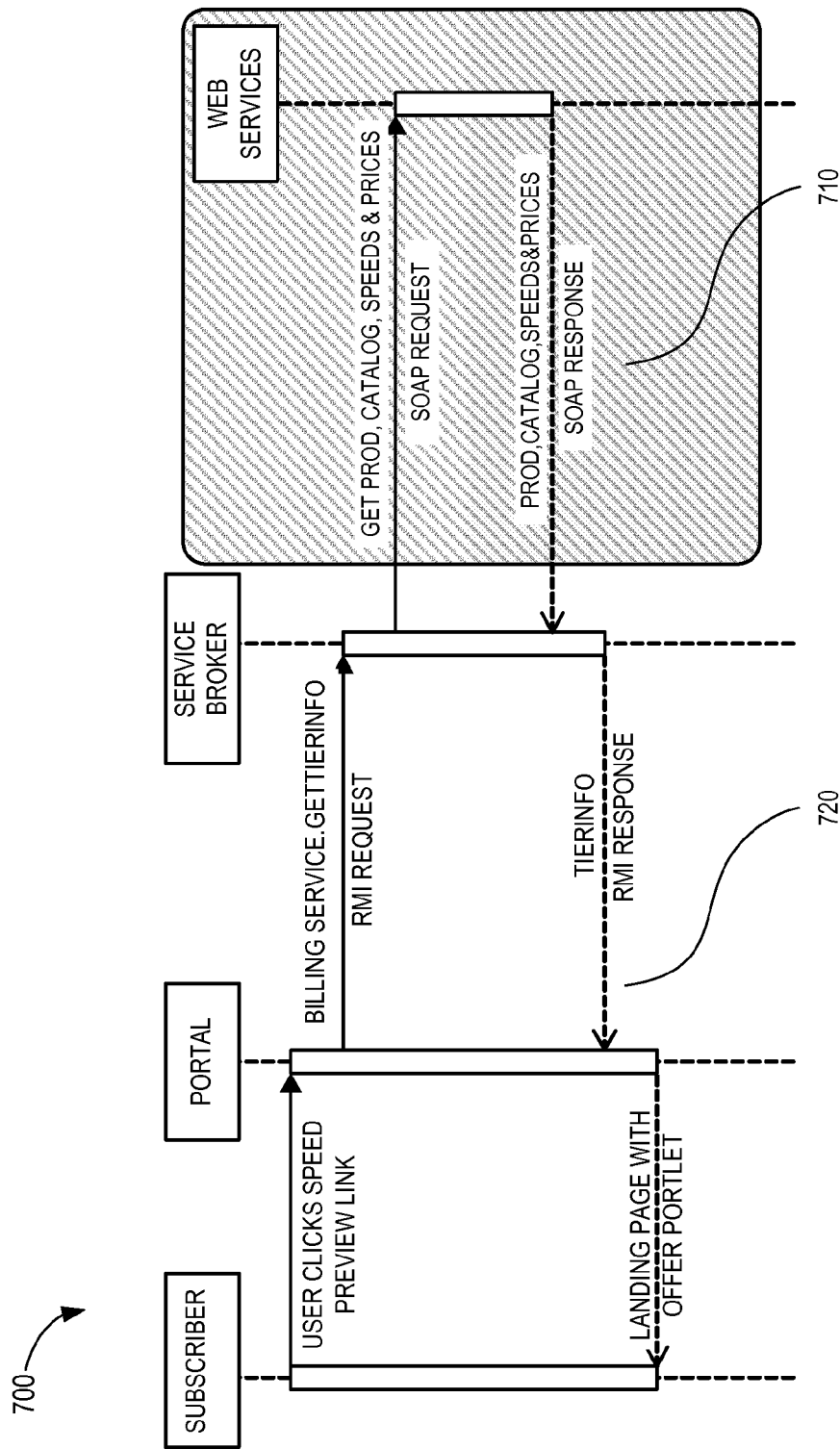
FIG. 7 illustrates a flow diagram for getting the price and speed information displayed on the Speed Preview landing page 700 according to one embodiment.

FIG. 7 illustrates a flow diagram for getting the price and speed information displayed on the Speed Preview landing page 700 according to one embodiment. Market specific price and speed information come from web services via SOAP calls 710. Tier names, speeds, and prices 720 are stored in the session for later use.

Figure 8:
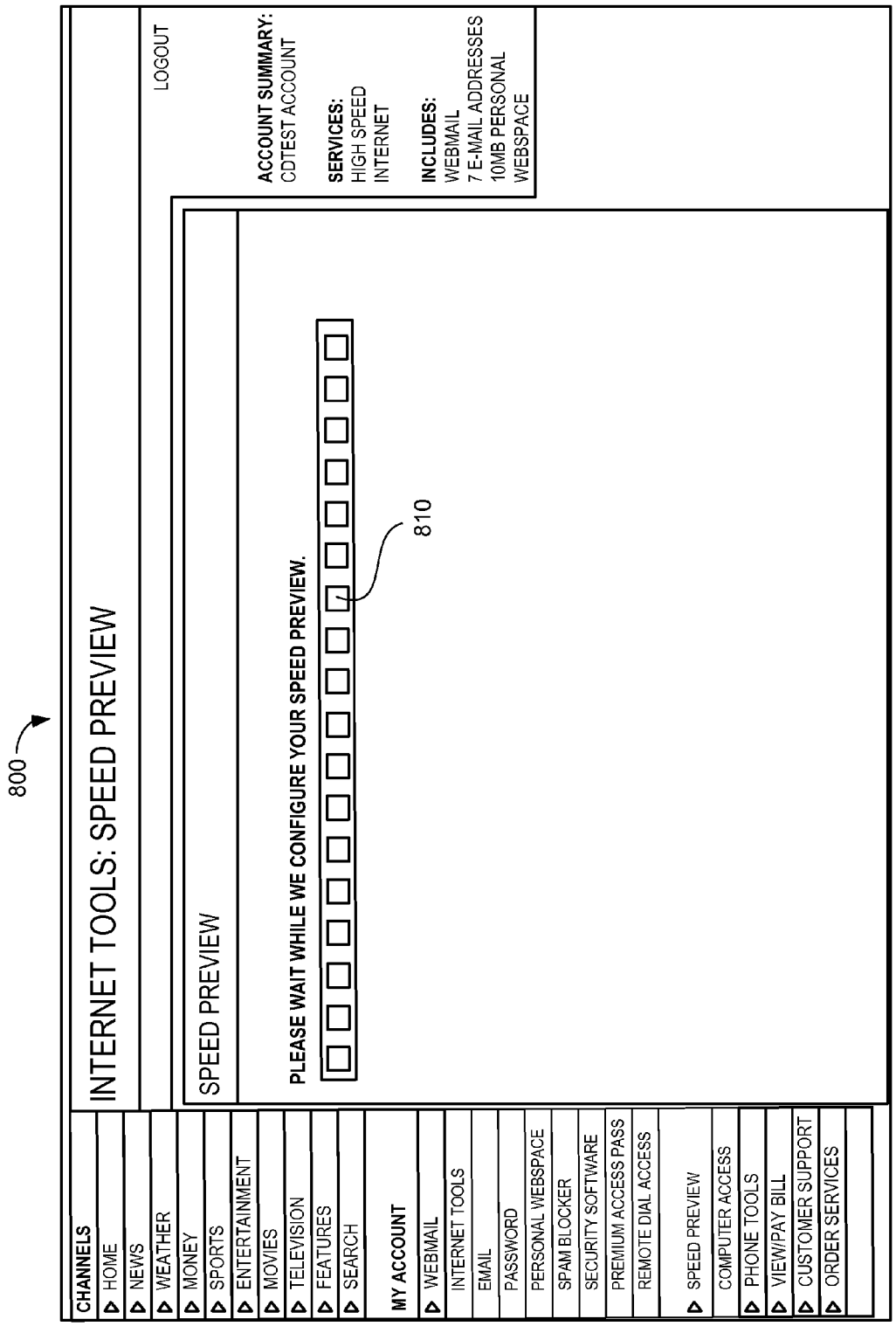
FIG. 8 shows the Speed Preview activation wait page screen that is displayed while seven eligibility checks are being performed according to one embodiment.

FIG. 8 shows the Speed Preview activation wait page screen 800 that is displayed while seven eligibility checks are being performed according to one embodiment. The bar 810 indicates the checks are being performed. After all the eligibility checks have been completed, the user is taken to one of three pages. If all of the eligibility checks succeeded, and the provisioning request was sent to PAWS, the Activation Results Page is displayed (see FIG. 11). If checks 1 or 2 failed, the Exceeded Limit Error Page (see FIG. 13) is displayed. The Activation Error Page (see FIG. 14) is displayed if the user failed one of the checks 3-7.

Table 1 describes each of the seven eligibility checks.

TABLE 1

| Eligibility Check | Description |
| --- | --- |
| Check 1 | The user has not activated a Speed Preview within the last 30 days. |
| Check 2 | The user has not used Speed Preview more than 6 times in the previous year. |
| Check 3 | The user has not violated the Acceptable Use Policy. |
| Check 4 | The account is not on the Seasonal Saver plan. |
| Check 5 | The account is in good standing. |
| Check 6 | The cable modem associated with the account meets DOCSIS 1.1 standards. |
| Check 7 | The cable modem is online and there is a device with an assigned IP address such as a router or PC. |

Figure 9:
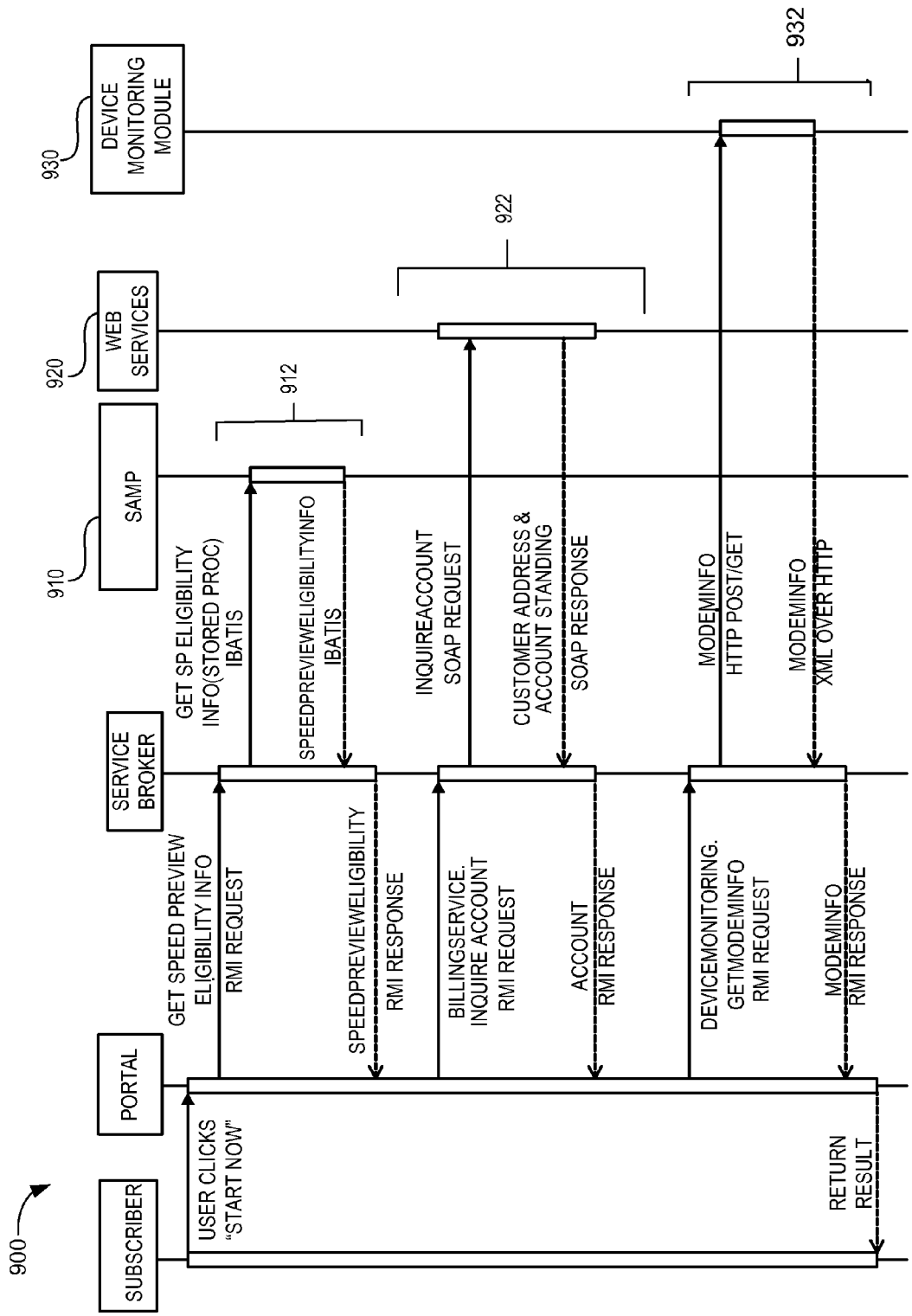
FIG. 9 illustrates the flow diagram of the seven eligibility checks performed for Speed Preview according to one embodiment.

FIG. 9 illustrates the flow diagram of the seven eligibility checks 900 performed for Speed Preview according to one embodiment. Eligibility checks 1-4 are made through the SAMP 910 stored procedure Get_SP_Eligibility_Info signaling 912. Eligibility check 5 is made through Web Services 920 via signaling 922. An "InquireAccount" call is made to determine if the account is in good standing. Eligibility checks 6-7 are made through device monitoring module 930 via signaling 932.

Figure 10:
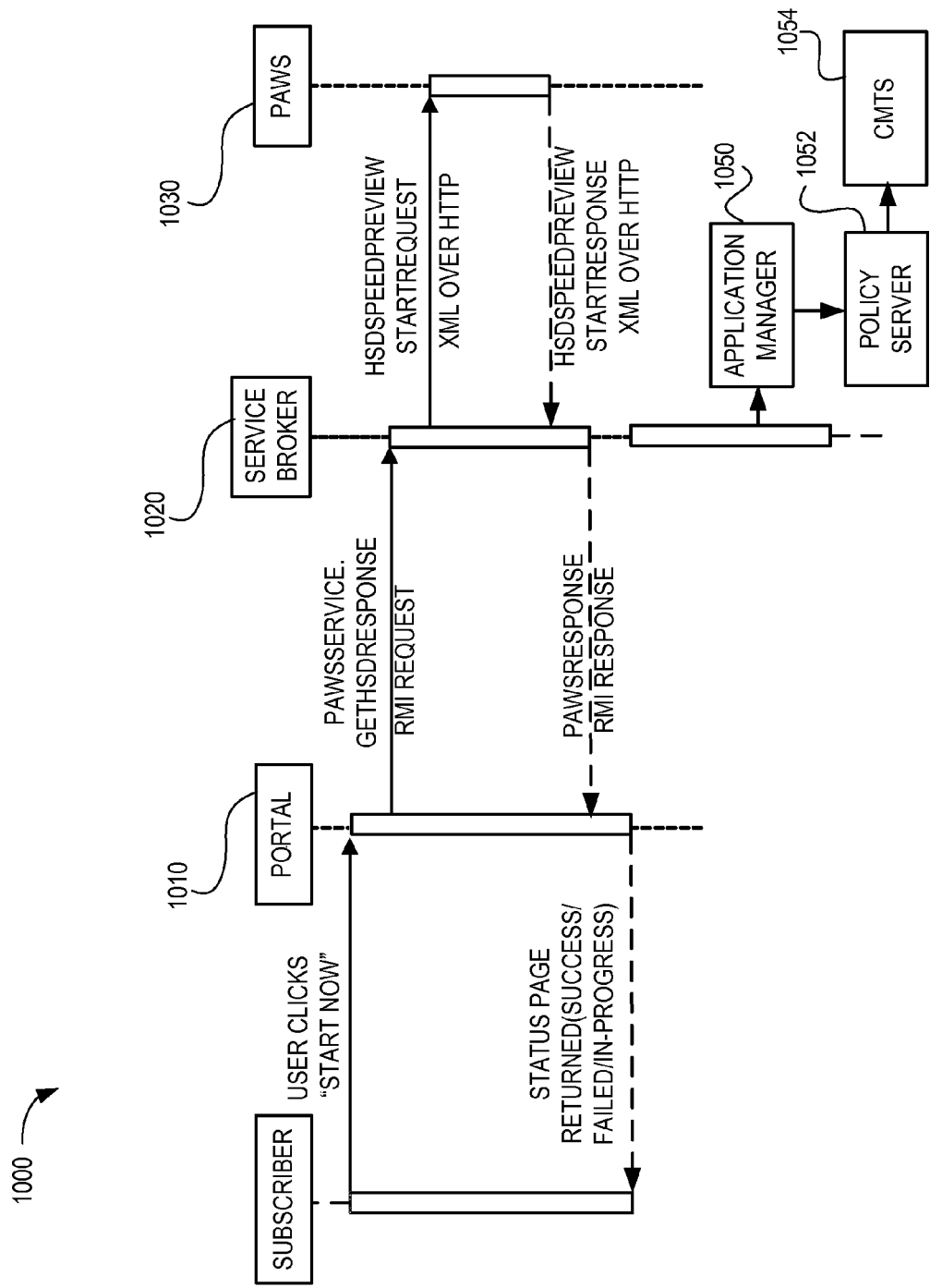
FIG. 10 illustrates the flow diagram of the Speed Preview Activation according to one embodiment.

FIG. 10 illustrates the flow diagram 1000 of the Speed Preview Activation according to one embodiment. The Portal 1010 receives the subscriber's request to start speed preview and sends the request to Service Broker 1020. Service Broker uses Provisioning Automation Web Services (PAWS) 1030 to provision the Speed Preview request and then returns the response back to the Portal 1010. The middleware module, e.g., Service Broker 1020, acts as a gateway and communicates with the other systems. The Service Broker 1020 also provides data identifying the user and the services available to the user to Application Manager 1050. The Application Manager 1050 communicates with the policy server 1052 to request a change to the current policy to provide an increase in bandwidth. The policy server 1052 controls allocated bandwidth for the user. The policy server 1052 allocates bandwidth according to a policy governing bandwidth subscribed to by the user and the available temporary speed increase. The policy server 1052 sends a request to the cable modem termination system (CMTS) 1054 to establish and terminate a new flow for providing faster bandwidth to the user for a period of time.

Figure 11:
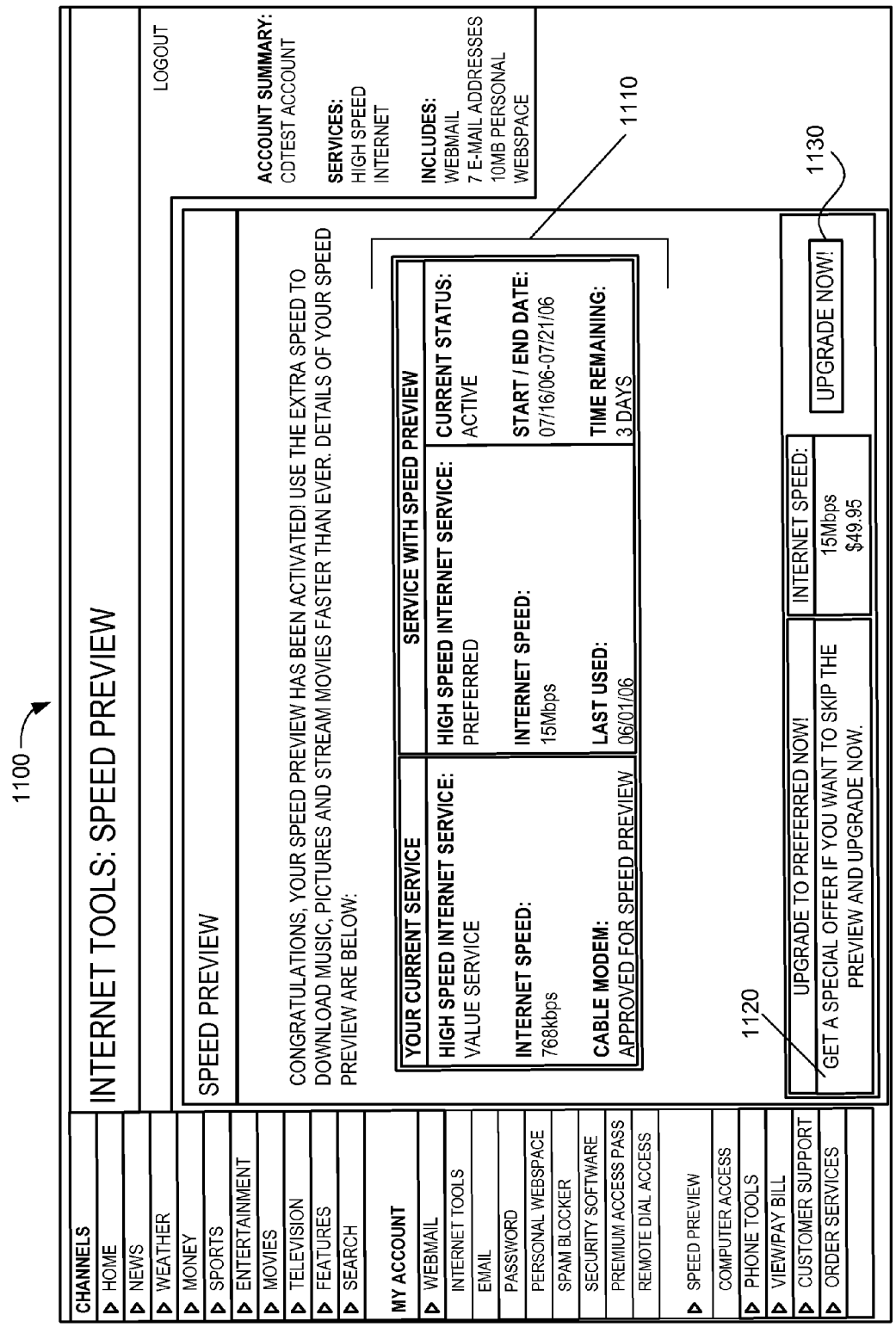
FIG. 11 shows the Activation Results Page according to one embodiment.

FIG. 11 shows the Activation Results Page 1100 according to one embodiment. The Activation Results Page 1100 shows the current subscription tier and the speed preview subscription tier information 1110. The Speed Preview status (active/processing), the Start/End dates, and the Time remaining are shown with the speed preview service information 1110. Refreshing the page will update this information. The user may choose to permanently upgrade to the preview service tier 1120 by clicking the Upgrade Now Button 1130.

Figure 12:
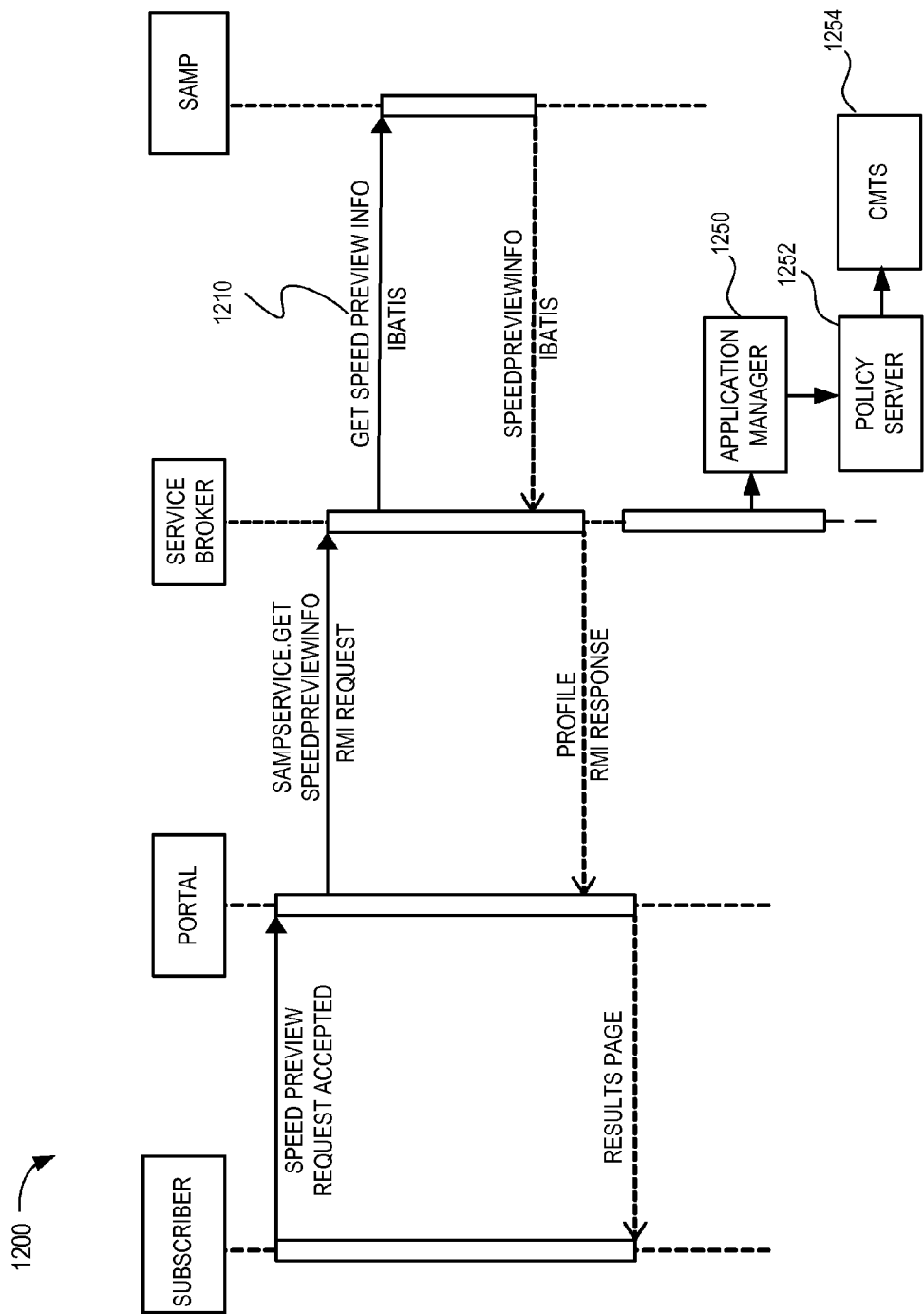
FIG. 12 illustrates the flow diagram for the Activation Results according to one embodiment.

FIG. 12 illustrates the flow diagram for the Activation Results 1200 according to one embodiment. The customer's current tier and preview tier information are retrieved from SAMP via the Get Speed Preview Info request 1210. For clarity, the Application Manager 1250, Policy Server 1252 and CMTS 1254 are shown.

Figure 13:
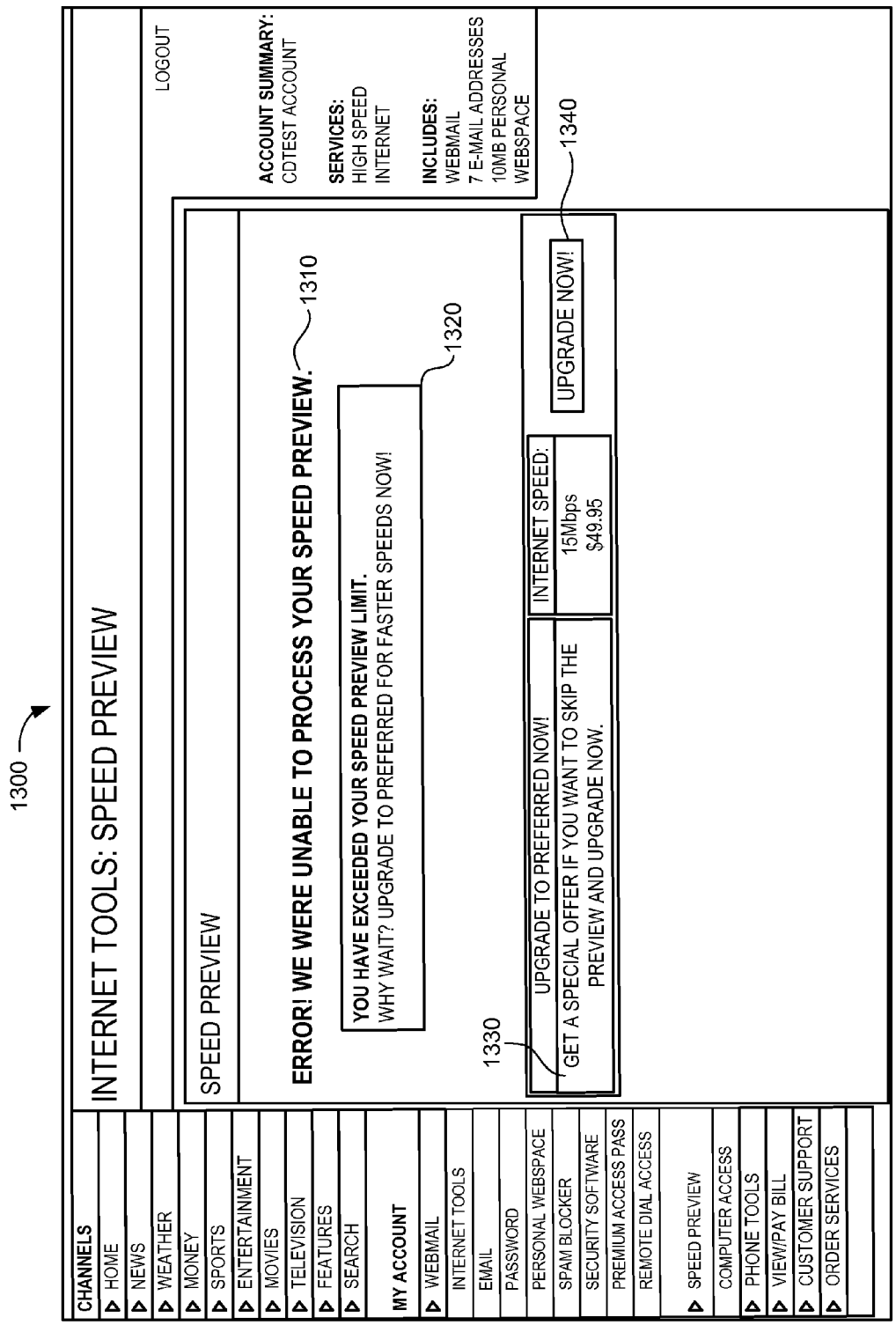
FIG. 13 shows the Exceeded Limit Error Page according to one embodiment.

FIG. 13 shows the Exceeded Limit Error Page 1300 according to one embodiment. An error message 1310 is displayed stating the service provided was unable to process Speed Preview. In addition, the exceeded limit reason and an offer to upgrade to Preferred 1320 is displayed. If the user wants to upgrade at the Internet Speed listed 1330, the user my click the Upgrade Now button 1340.

Figure 14:
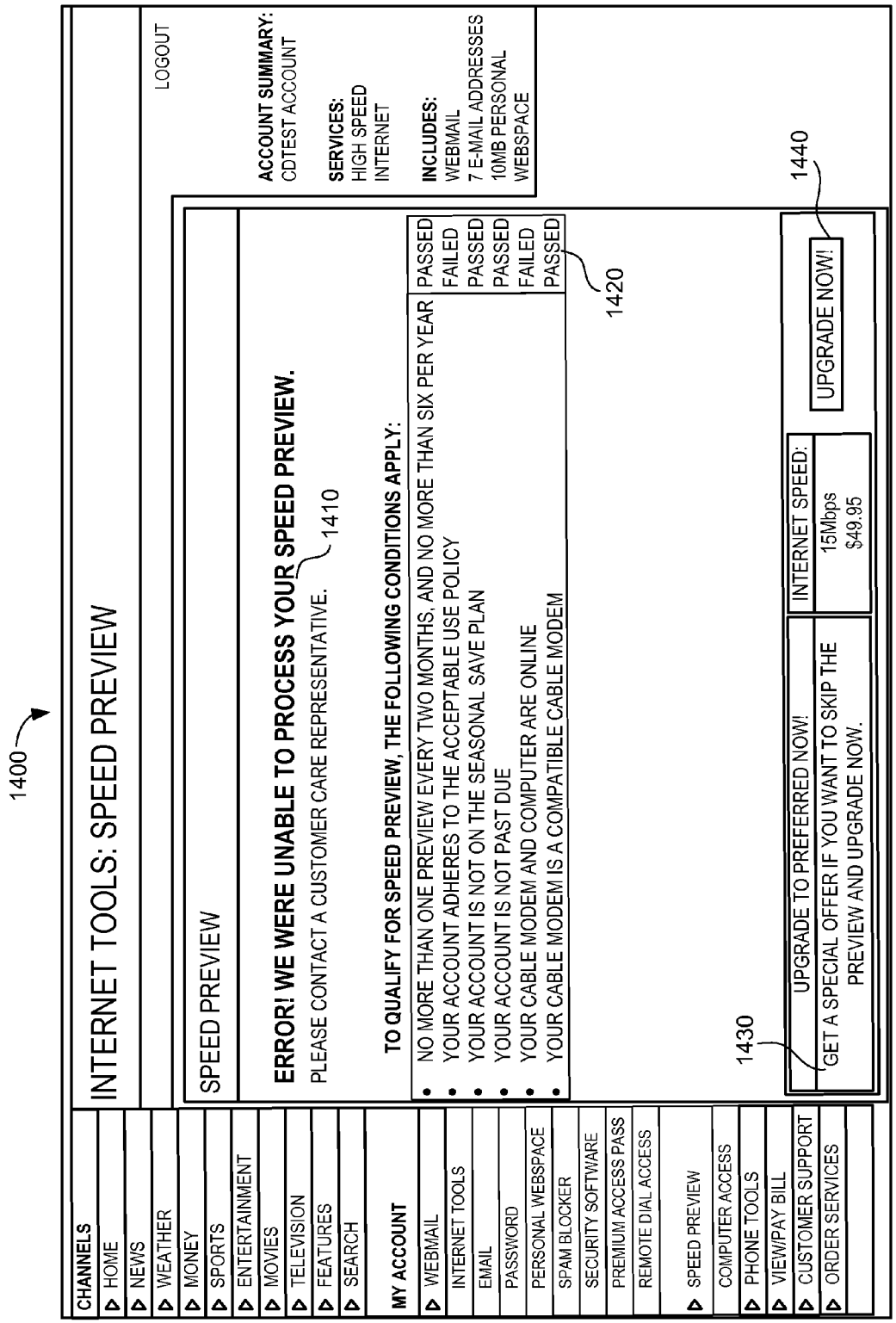
FIG. 14 shows the Activation Error Page according to one embodiment displayed when eligibility checks are failed.

FIG. 14 shows the Activation Error Page 1400 according to one embodiment displayed if any of the eligibility checks 3-7 are failed. The eligibility checks include the user violating the Acceptable Use Policy, having an account on the Seasonal Saver plan or not in good standing, and the cable modem not meeting DOCSIS 1.1 standards or being offline. The Activation Error Page 1400 displays and error message 1410 and lists which eligibility checks the user passed and which ones they failed 1420. If the user wants to upgrade to preferred service at the Internet Speed listed 1430, the user may click the Upgrade Now button 1440.

Figure 15:
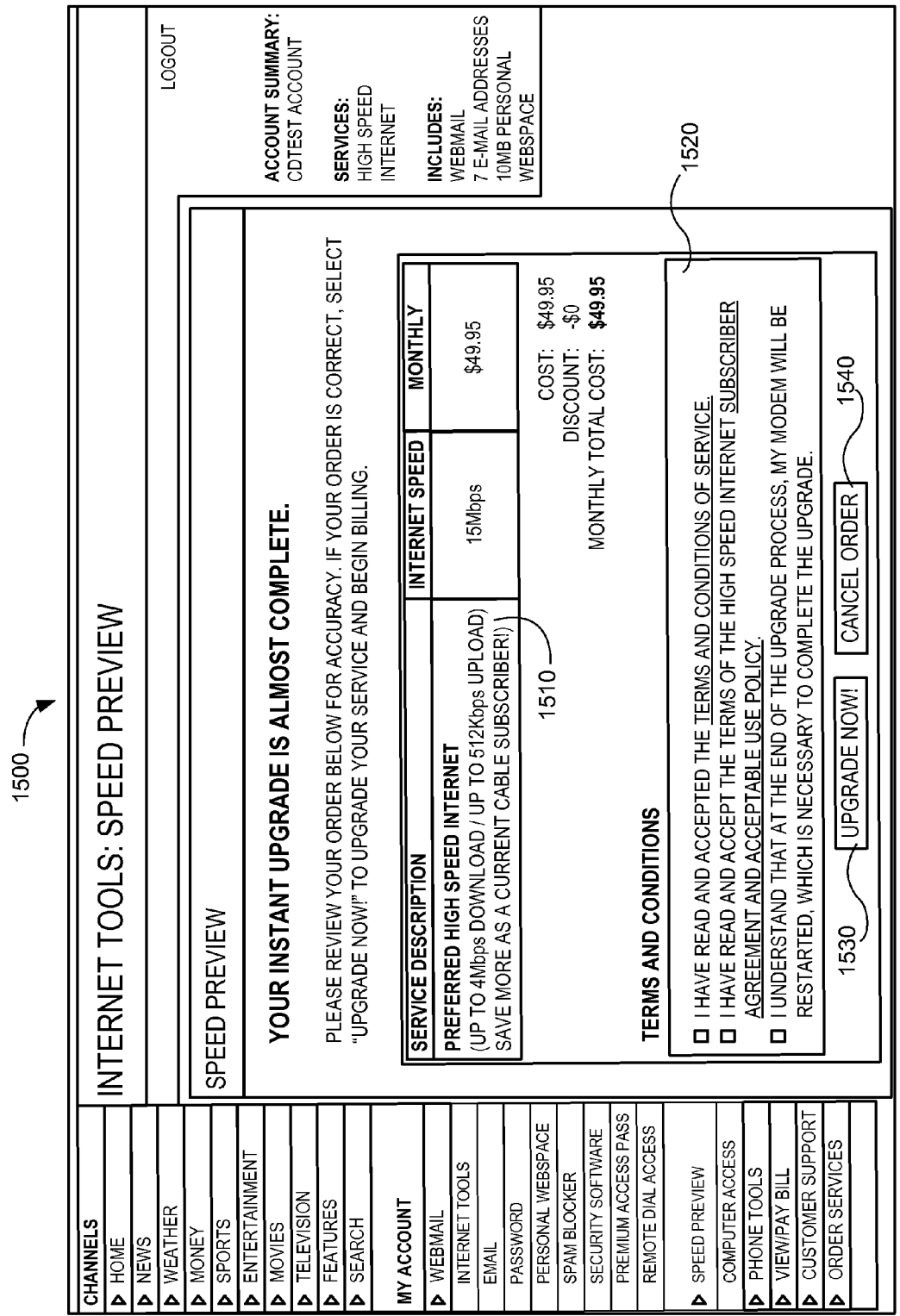
FIG. 15 shows the confirmation screen according to one embodiment where the user reviews their order for accuracy, acknowledges terms and conditions and also the process for completing the upgrade and then upgrades from one tier to another.

FIG. 15 shows the confirmation screen to permanently upgrade to a faster tier 1500 according to one embodiment where the user reviews their order for accuracy. An upgrade description 1510 and the terms and conditions 1520 are displayed. The user may confirm the order by selecting the Upgrade Now button 1530. To cancel the order, the user may select the Cancel Order button 1540.

Figure 16:
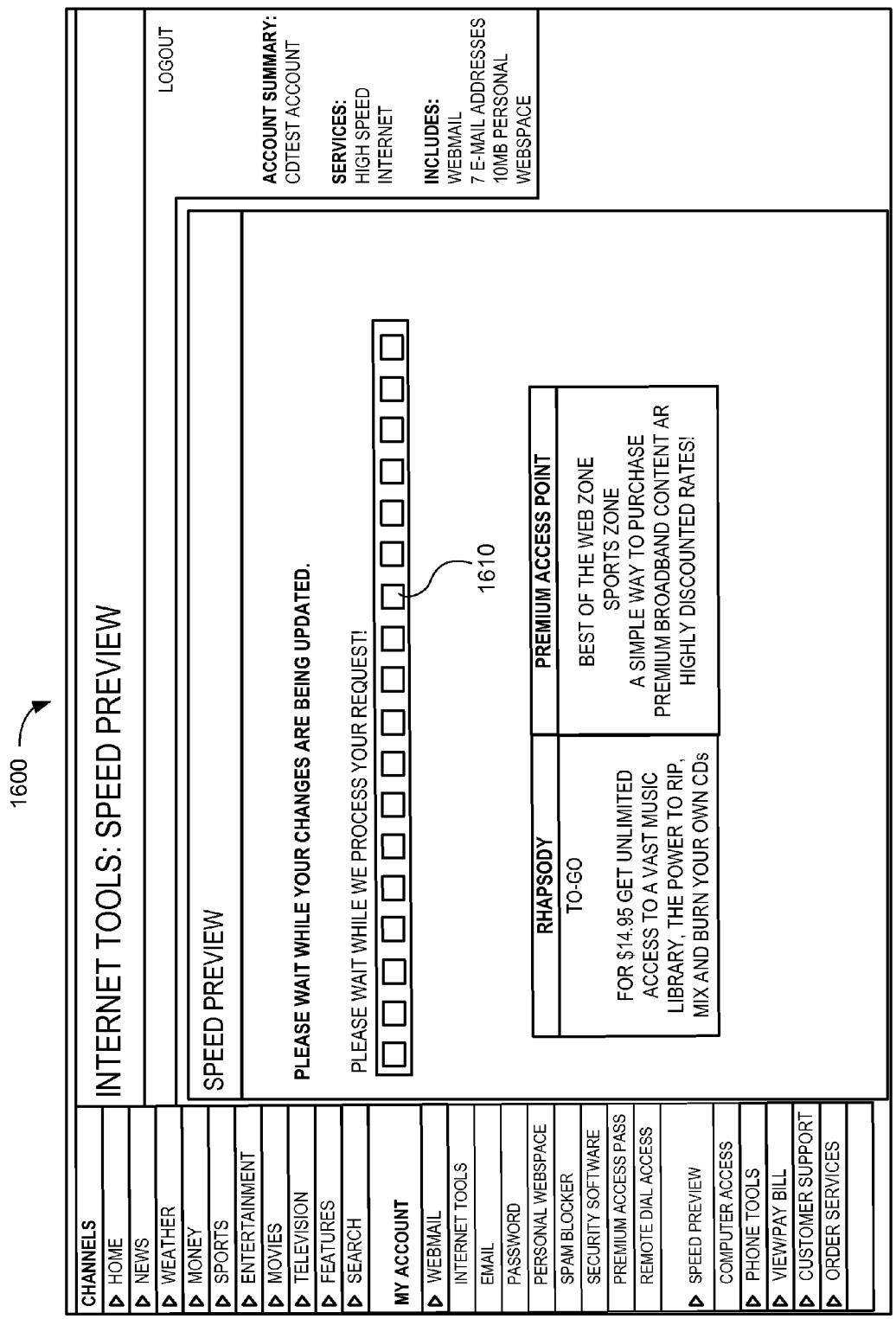
FIG. 16 shows the Upgrading Wait page that is displayed when the user clicks the Upgrade Now button in FIG. 15 according to one embodiment.

FIG. 16 shows the Upgrading Wait page 1600 that is displayed when the user clicks the Upgrade Now button (see FIG. 15) according to one embodiment. The bar 1610 indicates to the user the upgrade is being processed.

Figure 17:
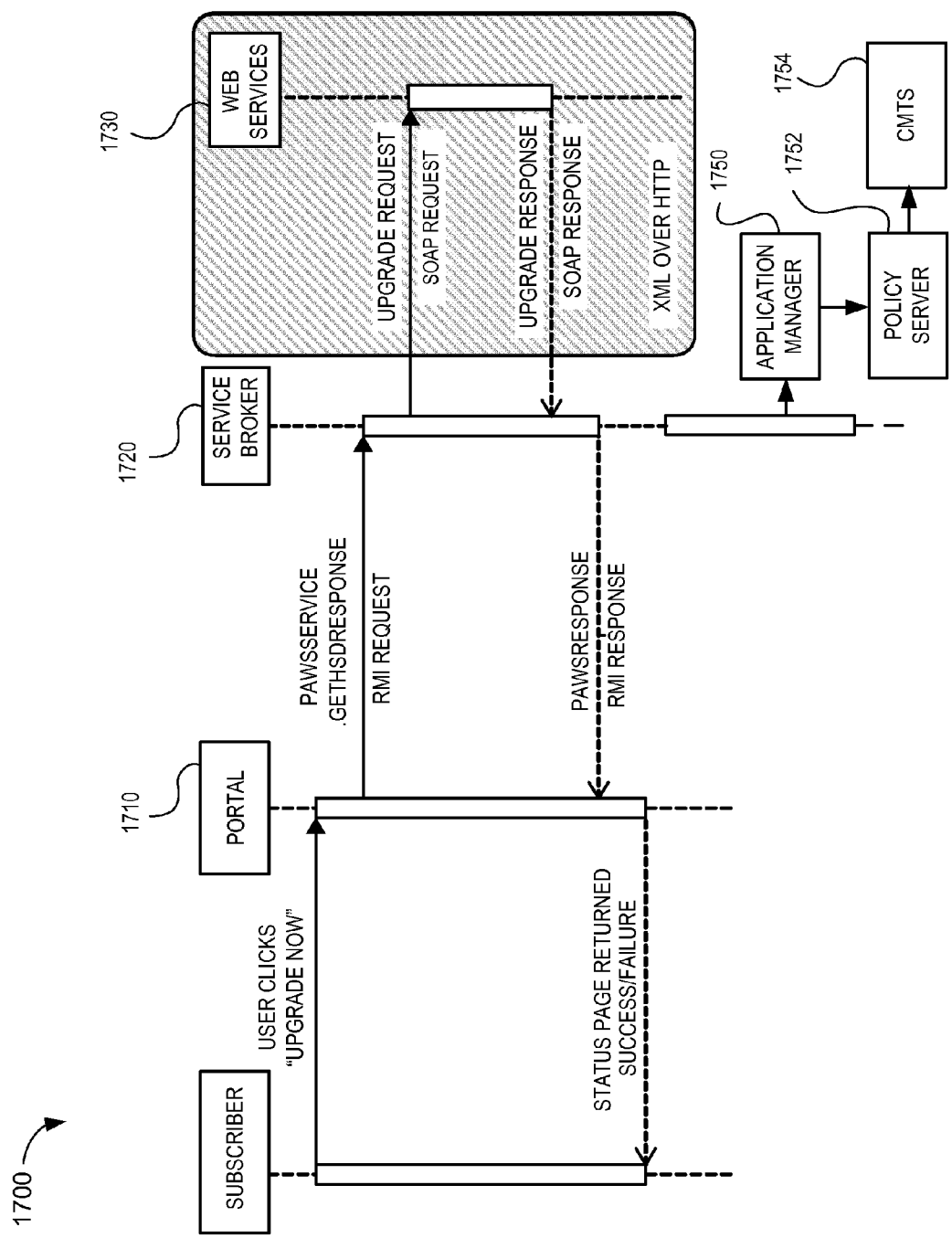
FIG. 17 illustrates the flow diagram for the Upgrade Request process according to one embodiment.

FIG. 17 illustrates the flow diagram for the Upgrading Wait page 1700 according to one embodiment. The portal 1710 sends the upgrade provisioning request to Web Services 1730 via Service Broker 1720. If the upgrade is accepted by the provisioning system, an order number is returned with the response from Web Services 1730. The Application Manager 1250, Policy Server 1252 and CMTS 1254 provision the upgrade to the modem (not shown).

FIG. 18 shows the Thank You page 1800 that is displayed if the upgrade request is accepted by the provisioning system according to one embodiment. The complete order information 1810 is displayed. The user may print the page by selecting Print Page 1820.

FIG. 19 shows the Printer Friendly Upgrade Thank You page 1900 according to one embodiment. The user may print the printer friendly version of the Thank You page (see FIG. 18) by selecting Print Page 1910.

Figure 20:
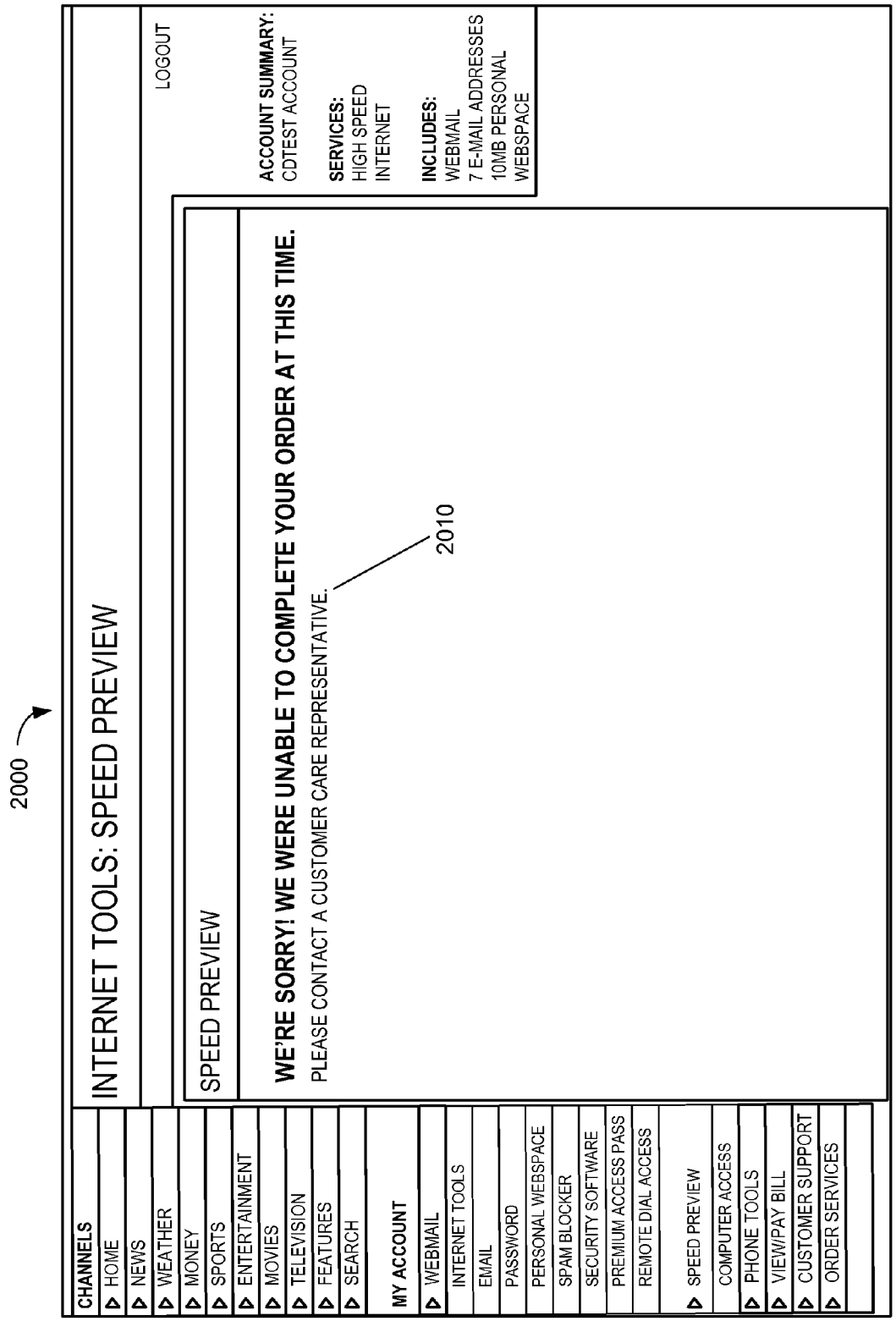
FIG. 20 shows the Speed Preview Processing Error page according to one embodiment.

FIG. 20 shows the Speed Preview Processing Error page 2000 according to one embodiment. The screen displays an error message 2010 to let the user know the order was unable to be completed.

Figure 21:
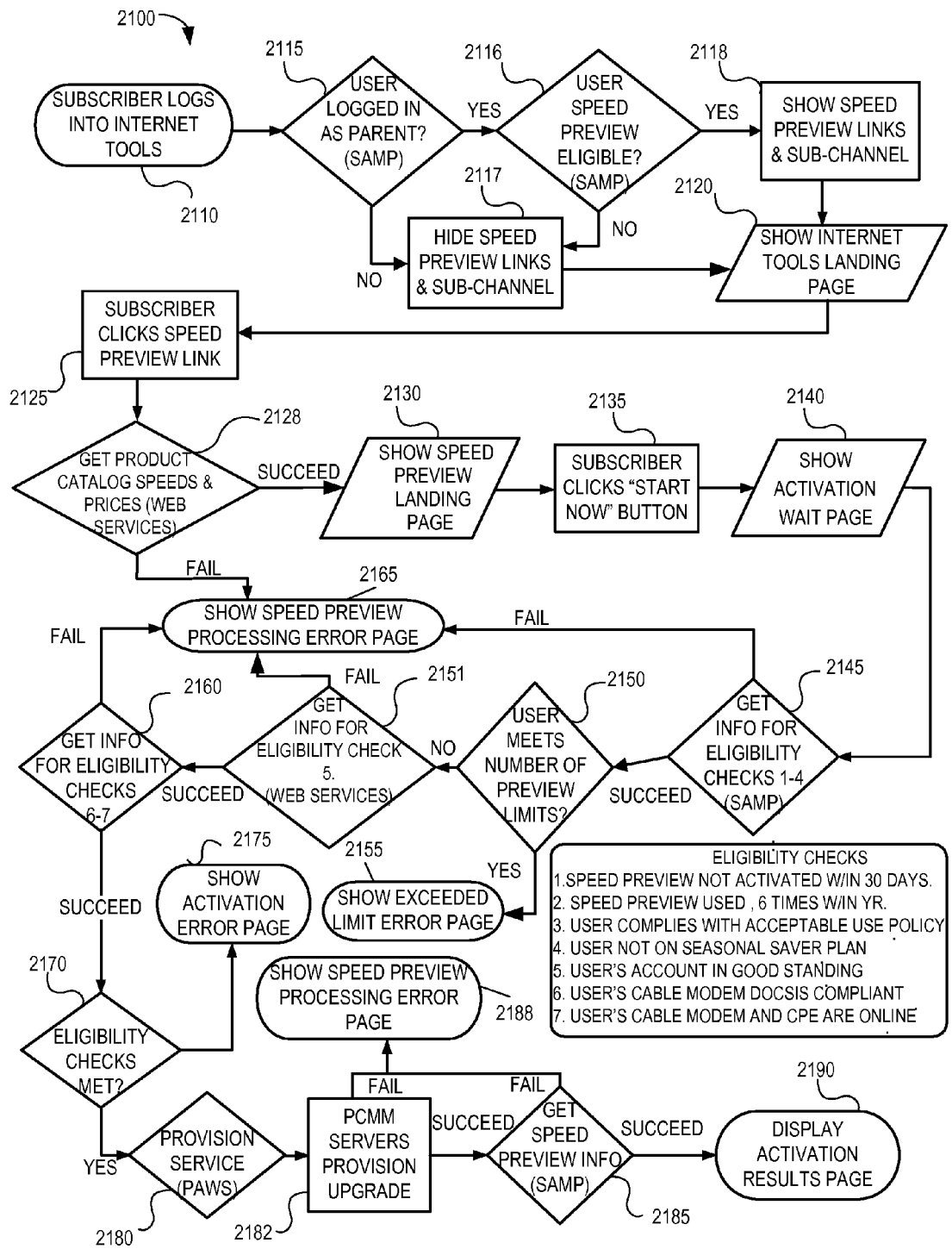
FIG. 21 shows the Speed Preview flow diagram according to one embodiment.

FIG. 21 shows the Speed Preview flow diagram 2100 according to one embodiment. The subscriber begins the process by logging into Internet Tools 2110. If the first eligibility checks 2115, 2116 are not passed, the speed preview links and sub-channel are hidden 2117.

If the first eligibility checks 2115, 2116 are passed, the Speed Preview links and sub-channel are displayed 2118. The Speed Preview links are shown on the Internet Tools Landing page 2120. The subscriber clicks the Speed Preview link 2125. The product catalog speeds and prices are retrieved 2128. If the retrieval of the catalog speeds and prices fails, the speed preview processing error page is displayed 2165. If the retrieval of the catalog speeds and prices succeeds, the speed preview landing page is displayed 2130. The subscriber clicks the Start Now button 2135 to show the Activation Wait page 2140. Information for performing eligibility checks 1-4 is obtained 2145. If the information for performing eligibility checks 1-4 is not retrieved, the speed preview processing error page is displayed 2165. If the information for performing eligibility checks 1-4 is retrieved successfully, a determination is made whether the user meets the number of preview limits 2150. If the user surpassed the limit on the number of speed previews within a set time period, the Exceeded Limit Error page is displayed 2155.

If the user did not surpass the limit on the number of speed previews within a set time period, information for performing eligibility check 5 is obtained 2151. If the retrieval of the information for performing eligibility check 5 fails, the speed preview processing error page is displayed 2165. If the retrieval of the information for performing eligibility check 5 succeeds, the information for performing eligibility check 6 is retrieved 2160. If the retrieval of information for performing eligibility check 6 fails, the speed preview processing error page is displayed 2165. If the retrieval of information for performing eligibility check 6 succeeds, a determination of whether the eligibility checks were met 2170 is performed. If not, the Activation Error page 2175 is displayed. If yes, the request for Speed Preview is sent to the provision services (PAWS) 2180. PAWS 2180 communicates with the PCMM servers to provision the upgrade 2182. If provisioning of the Speed Preview fails, the Speed Preview Processing Error page 2188 is displayed. If provisioning of the Speed Preview is successful, the speed preview information is retrieved 2185. If the retrieval of the speed preview information fails, the Speed Preview Processing Error page 2188 is displayed. If the retrieval of the speed preview information succeeds, the Activation Results page 2190 is displayed.

Figure 22:
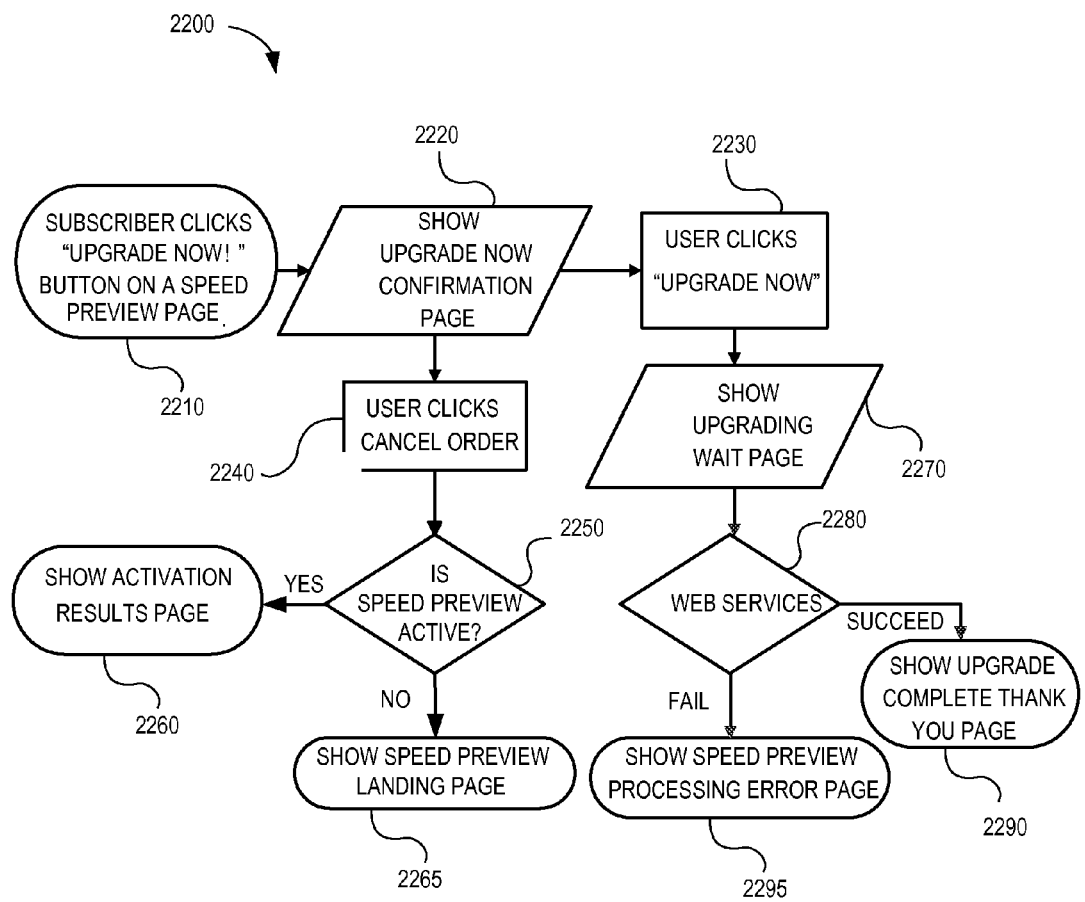
FIG. 22 shows the Permanent Upgrade flow diagram according to one embodiment.

FIG. 22 shows the Permanent Upgrade flow diagram 2200 according to one embodiment. The subscriber clicks the Upgrade Now button to begin the process 2210. From the Confirmation Page 2220 the user may click Upgrade Now 2230 or Cancel Order 2240 button. If the Cancel Order 2240 is selected and the Speed Preview is still active 2250, the Activation Results Page is displayed 2260, else the Speed Preview landing page 2265 is displayed. If the Upgrade Now 2230 is selected, the Upgrading Wait page 2270 is displayed. The upgrade is provisioned 2280. If the upgrade is successful, the Upgrade Thank You page 2290 is displayed. Else, the Speed Preview Processing Error page 2295 is displayed.

Figure 23:
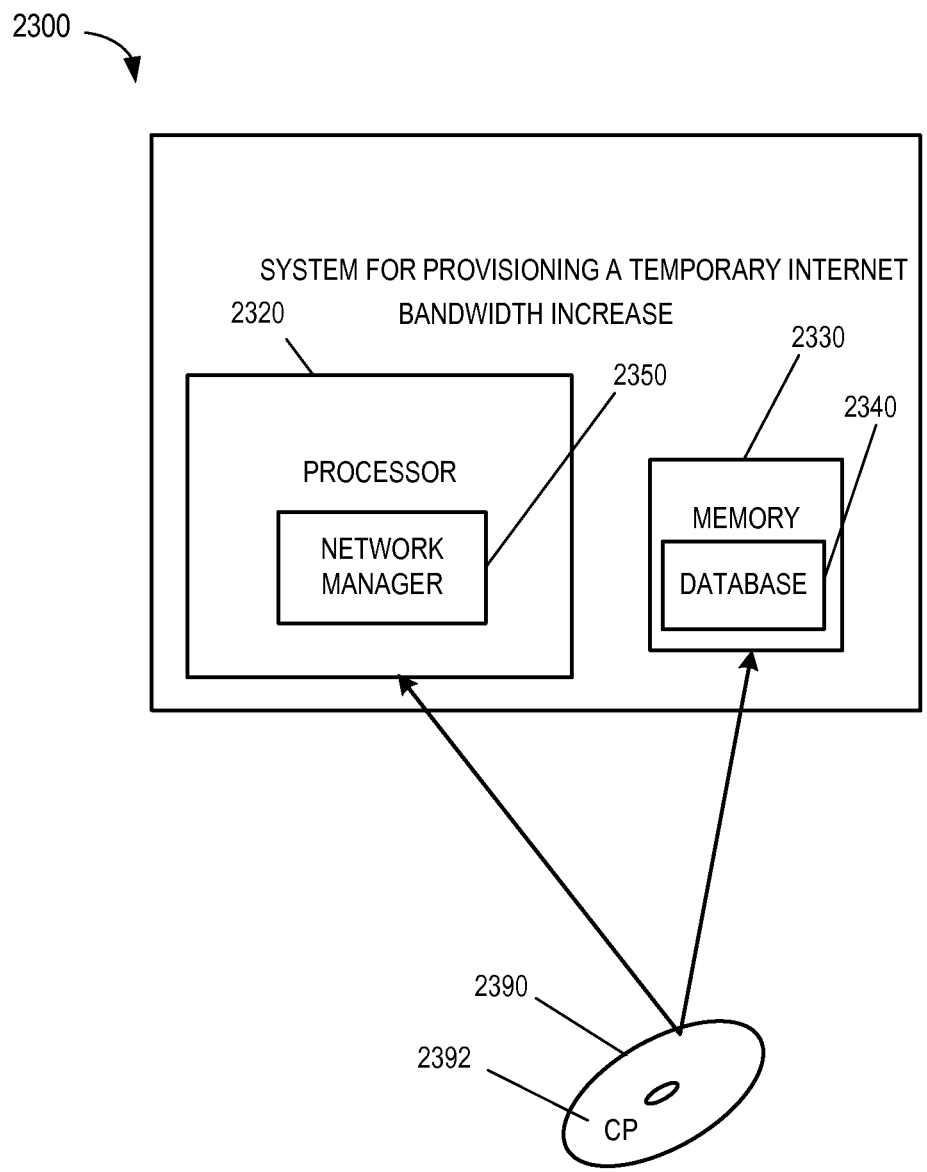
FIG. 23 illustrates a suitable computing environment for implementing a system as described above in FIGS. 1-22 according to an embodiment.

FIG. 23 illustrates a suitable computing environment 2300 for implementing a system as described above in FIGS. 1-22 according to an embodiment. In FIG. 23, a system for provisioning a temporary bandwidth increase 2300 includes a processor 2320 and memory 2330. Embodiments may also be implemented in combination with other types of computer systems and program modules. Generally, program modules include routines, programs, components, data structures, and other types of structures that perform particular tasks or implement particular abstract data types. By way of example, computer readable media 2390 can include computer storage media or other tangible media. Computer storage media 2390 includes volatile and nonvolatile, removable and non-removable media implemented in any method or technology for storage of information 2392, such as computer readable instructions, data structures, program modules or other data. Moreover, those skilled in the art will appreciate that the invention may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network.

Embodiments implemented on computer-readable media 2390 may refer to a mass storage device, such as a hard disk or CD-ROM drive. However, it should be appreciated by those skilled in the art that computer-readable media can be any available media that can be accessed or utilized by a processing device, e.g., server or communications network provider infrastructure.

By way of example, and not limitation, computer-readable media 2390 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible medium which can be used to store the desired information and which can be accessed by a processing device.

As mentioned briefly above, a number of program modules and data files may be stored and arranged for controlling the operation of processing devices. Thus, one or more processing devices 2320 may be configured to execute instructions that perform the operations of embodiments of the present invention.

It should also be appreciated that various embodiments of the present invention can be implemented (1) as a sequence of computer implemented acts or program modules running on a processing device and/or (2) as interconnected machine logic circuits or circuit modules within the processing devices. The implementation is a matter of choice dependent on the performance requirements. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Memory 2330 thus may store the computer-executable instructions that, when executed by processor 2320, cause the processor 2320 to implement a system as illustrated above in FIGS. 1-22 according to an embodiment of the invention. However, memory 2330 may also be configured to provide a database 2340 for storing information required for provisioning the temporary increase in bandwidth. A network manager 2350 may be implemented by the processor 2320 for monitoring and managing the high speed Internet network.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing a temporary Internet bandwidth increase, comprising:

providing, by a service provider, a plurality of bandwidth allocation subscriptions providing a plurality of Internet speed tiers offered to a subscriber according to an escalating price as an increased bandwidth is provided by a higher Internet speed tier;

providing a bandwidth allocation subscription to the subscriber;

presenting at least one selection option for a temporary preview, without charge, of a bandwidth increase for an Internet speed tier associated with an increased bandwidth allocation subscription, wherein the increased bandwidth allocation subscription is greater bandwidth than the bandwidth allocation subscription;

receiving a request to receive the temporary preview of the increased bandwidth allocation subscription for free;

as a result of receiving the request to receive the temporary preview of the increased bandwidth allocation subscription for free, receiving a subscriber selection of the presented at least one selection option for the temporary preview, without charge, of the bandwidth increase for the Internet speed tier associated with the increased bandwidth allocation subscription;

determining whether the user is eligible for provisioning the temporary preview, without charge, of the bandwidth increase;

in response to receiving the subscriber selection and if the user is eligible for provisioning the temporary preview, without charge, of the bandwidth increase, provisioning the temporary preview, without charge, of the bandwidth increase for a trial period of time after which the temporary preview without charge ends;

automatically returning to the bandwidth allocation subscription without a request by the subscriber; and in response to the temporary preview ending as a result of the trial period of time ending, receiving a subscriber selection to upgrade from the bandwidth allocation subscription, for a charge, to the Internet speed tier associated with the increased bandwidth allocation subscription.

2. The method of claim 1, wherein the providing a temporary bandwidth increase further comprises providing the temporary bandwidth increase for a predetermined period of time.

3. The method of claim 2, wherein the predetermined period of time is a period of time determined by billing status.

4. The method of claim 2, wherein the predetermined period of time is a temporary fixed period of time.

5. The method of claim 4 further comprising terminating the increase in Internet bandwidth after lapse of the temporary fixed period of time.

6. The method of claim 4 further comprising terminating the increase in Internet bandwidth unless the customer requests a permanent tier modification to an Internet speed tier associated with an increased bandwidth allocation subscription.

7. The method of claim 1, further comprising presenting to the subscriber a speed preview link on the Internet tools page for navigating to a speed preview selection page after verifying the eligibility of the customer and obtaining billing data and information regarding tier speeds and prices.

8. The method of claim 1 further comprises retrieving a current subscription tier of the user and service information regarding the increase in Internet bandwidth provided by an Internet speed tier associated with an increased bandwidth allocation subscription.

9. The method of claim 8, wherein the retrieving service information regarding the increase in Internet bandwidth further comprises generating a status for the increase in Internet bandwidth, a start and stop time, and a time remaining.

10. A system for providing a temporary Internet bandwidth increase, comprising:
a cable modem termination system for providing a plurality of bandwidth allocation subscriptions providing a plurality of Internet speed tiers offered to a subscriber according to an escalating price as an increased bandwidth is provided by a higher Internet speed tier;
a bandwidth allocation subscription subscribed to by the subscriber;
a network access device, coupled to the cable modem termination system, for receiving from a subscriber login credentials for accessing Internet tools page for managing subscriber options and for presenting to the subscriber a speed preview link on the Internet tools page for navigating to a speed preview selection page; and
a service broker, coupled to the network access device, for receiving a subscriber indication of the speed preview link to navigate to the speed preview selection page, for presenting at least one selection option for a temporary preview, without charge, of the bandwidth increase for an Internet speed tier associated with an increased bandwidth allocation subscription, wherein the increased bandwidth allocation subscription is greater bandwidth than the bandwidth allocation subscription subscriber to by the subscriber, the service broker also for receiving a request from the subscriber to receive the temporary preview of the increased bandwidth allocation subscription for free, wherein the request from the subscriber to receive the temporary preview of the increased bandwidth allocation subscription for free comprises receiving a subscriber selection of the presented at least one selection option for the temporary preview, without charge, of the bandwidth increase for the Internet speed tier associated with the increased bandwidth allocation subscription, and for determining whether the user is eligible for provisioning the temporary preview, without charge, of the bandwidth increase;
wherein the cable modem termination system provides the subscriber the temporary preview, without charge, of the bandwidth increase for a trial period of time after which the temporary preview without charge ends in response to the service broker determining the user is eligible for provisioning the temporary preview, without charge, of the bandwidth increase and receiving the subscriber selection of the presented at least one selection option for the temporary preview, without charge, of the bandwidth increase for the Internet speed tier associated with the increased bandwidth allocation subscription, automatically returning to the bandwidth allocation subscription without a request by the subscriber, and in response to the temporary preview ending as a result of the trial period of time ending, the service broker also receives a subscriber selection to upgrade from the bandwidth allocation subscription, for a charge, to the Internet speed tier associated with the increased bandwidth allocation subscription.

11. The system of claim 10, wherein the predetermined period of time is a temporary fixed period of time.

12. The method of claim 1, wherein the provisioning an increased bandwidth further comprises providing an immediate upgrade to the increased bandwidth allocation subscription associated with the selected Internet speed tier.

13. The method of claim 1, further comprising presenting to the subscriber a speed preview link on the Internet tools page when the subscriber login credentials meet predetermined criteria.

14. The system of claim 10, wherein the predetermined period of time is a period of time determined by billing status.

15. The system of claim 10, wherein the cable modem termination system provides a temporary bandwidth increase by providing the temporary bandwidth increase for a predetermined period of time.

16. The system of claim 10, wherein the cable modem termination system provisions an increased bandwidth by providing an immediate upgrade to the increased bandwidth allocation subscription associated with the selected Internet speed tier.

17. The system of claim 10, wherein the service broker presents a speed preview link on the Internet tools page only when the subscriber login credentials meet predetermined criteria.

18. A computer readable storage memory including executable instructions which, when executed by a processor, provides an Internet bandwidth increase by:
providing, by a service provider, a plurality of bandwidth allocation subscriptions providing a plurality of Internet speed tiers offered to a subscriber according to an escalating price as an increased bandwidth is provided by a higher Internet speed tier;
providing a bandwidth allocation subscription to the subscriber;
receiving from a subscriber login credentials for accessing Internet tools page for managing subscriber options;
presenting to the subscriber a speed preview link on the Internet tools page for navigating to a speed preview selection page;
receiving a subscriber indication of the speed preview link to navigate to the speed preview selection page;
presenting at least one selection option for a temporary preview, without charge, of a bandwidth increase for an Internet speed tier associated with an increased bandwidth allocation subscription, wherein the increased bandwidth allocation subscription is greater bandwidth than the bandwidth allocation subscription;
receiving a request to receive the temporary preview of the increased bandwidth allocation subscription for free;
as a result of receiving the request to receive the temporary preview of the increased bandwidth allocation subscription for free, receiving a subscriber selection of the presented at least one selection option for the temporary preview, without charge, of the bandwidth increase for the Internet speed tier associated with the increased bandwidth allocation subscription;
determining whether the user is eligible for provisioning the temporary preview, without charge, of the bandwidth increase;
in response to receiving the subscriber selection and if the user is eligible for provisioning the temporary preview, without charge, of the bandwidth increase, provisioning the temporary preview, without charge, of the bandwidth increase for a trial period of time after which the temporary preview without charge ends;
automatically returning to the bandwidth allocation subscription without a request by the subscriber; and
in response to the temporary preview ending as a result of the trial period of time ending, receiving a subscriber selection to upgrade from the bandwidth allocation subscription, for a charge, to the Internet speed tier associated with the increased bandwidth allocation subscription.

\* \* \* \* \*